United States Patent
Matsumoto et al.

(10) Patent No.: US 10,138,786 B2
(45) Date of Patent: Nov. 27, 2018

(54) EXHAUST GAS PURIFICATION APPARATUS OF INTERNAL COMBUSTION ENGINE

(71) Applicant: TOYOTA JIDOSHA KABUSHIKI KAISHA, Toyota-shi, Aichi (JP)

(72) Inventors: Arifumi Matsumoto, Gotenba (JP); Toru Kidokoro, Hadano (JP); Taiga Hagimoto, Susono (JP); Kenji Furui, Susono (JP); Akifumi Uozumi, Susono (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 115 days.

(21) Appl. No.: 15/502,070

(22) PCT Filed: Aug. 4, 2015

(86) PCT No.: PCT/JP2015/003923
§ 371 (c)(1),
(2) Date: Feb. 6, 2017

(87) PCT Pub. No.: WO2016/021187
PCT Pub. Date: Feb. 11, 2016

(65) Prior Publication Data
US 2017/0226908 A1  Aug. 10, 2017

(30) Foreign Application Priority Data
Aug. 7, 2014  (JP) .................. 2014-161092

(51) Int. Cl.
*F01N 3/10* (2006.01)
*F01N 3/20* (2006.01)
(Continued)

(52) U.S. Cl.
CPC ........ *F01N 3/208* (2013.01); *F01N 2560/026* (2013.01); *F01N 2610/02* (2013.01);
(Continued)

(58) Field of Classification Search
CPC .............................................. F01N 2900/1602
See application file for complete search history.

(56) References Cited

U.S. PATENT DOCUMENTS

2003/0182935 A1  10/2003  Kawai et al.
2009/0288397 A1  11/2009  Shimomura et al.
(Continued)

FOREIGN PATENT DOCUMENTS

JP    2008-215213    9/2008
JP    2009-281350    12/2009
WO    WO 2010/082307 A1    7/2010

*Primary Examiner* — Mark Laurenzi
*Assistant Examiner* — Jason Sheppard
(74) *Attorney, Agent, or Firm* — Finnegan, Henderson, Farabow, Garrett & Dunner, LLP

(57) ABSTRACT

An additive amount of a reducing agent to a selective reduction-type NOx catalyst is optimized. An ammonia adsorption amount of the selective reduction-type NOx catalyst is estimated based on one or a plurality of prescribed parameters related to the ammonia adsorption amount and a specific ammonia adsorption amount that is an estimated value of the ammonia adsorption amount specified by at least one of a maximum value and a minimum value of an estimated value of the ammonia adsorption amount is estimated based on an error in the prescribed parameter, and when the specific ammonia adsorption amount is outside a target range of the ammonia adsorption amount, addition of an ammonia precursor or ammonia using an adding valve is controlled such that the specific ammonia adsorption amount returns to the target range.

6 Claims, 13 Drawing Sheets

(52) U.S. Cl.
CPC ............. *F01N 2610/1453* (2013.01); *F01N 2900/1622* (2013.01)

(56) References Cited

U.S. PATENT DOCUMENTS

2010/0095933 A1    4/2010   Moriya et al.
2011/0271663 A1   11/2011   Sato et al.

[Fig. 1]
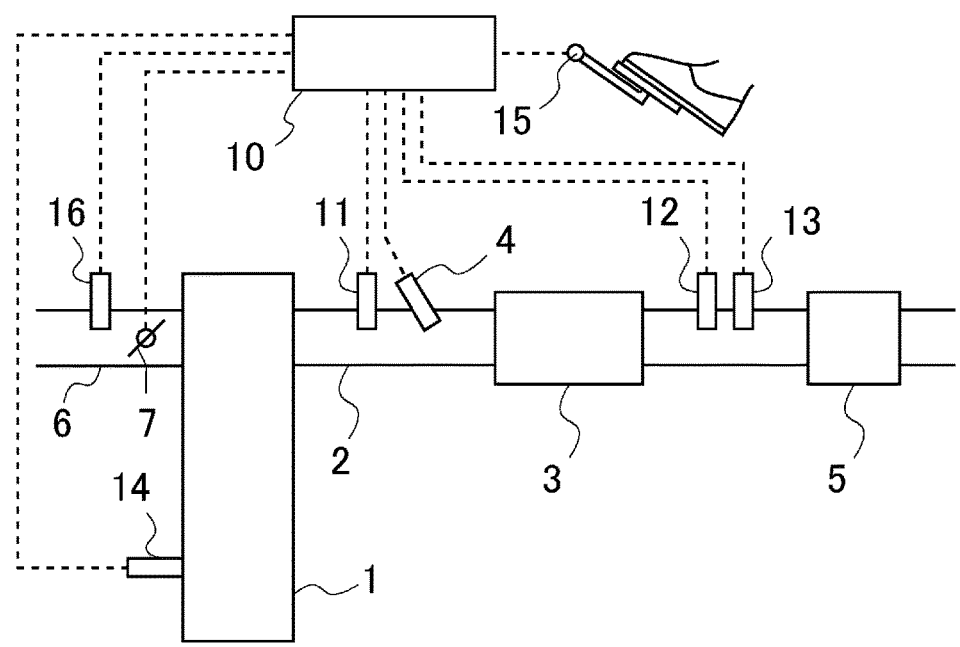

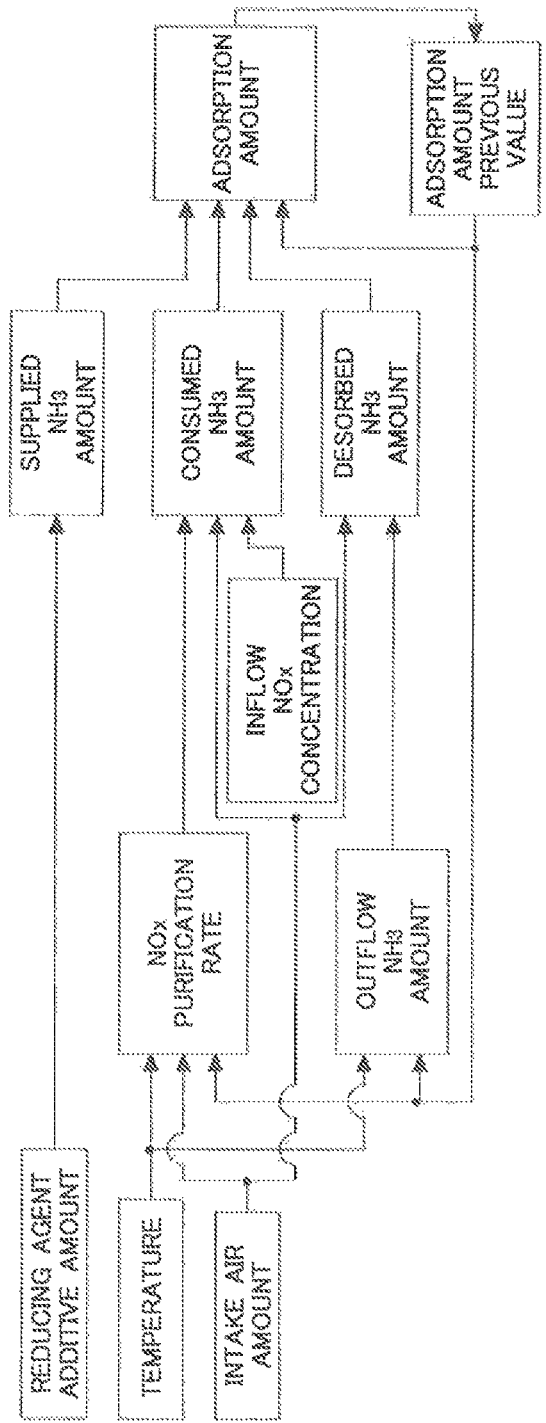
[Fig. 2]

[Fig. 3]
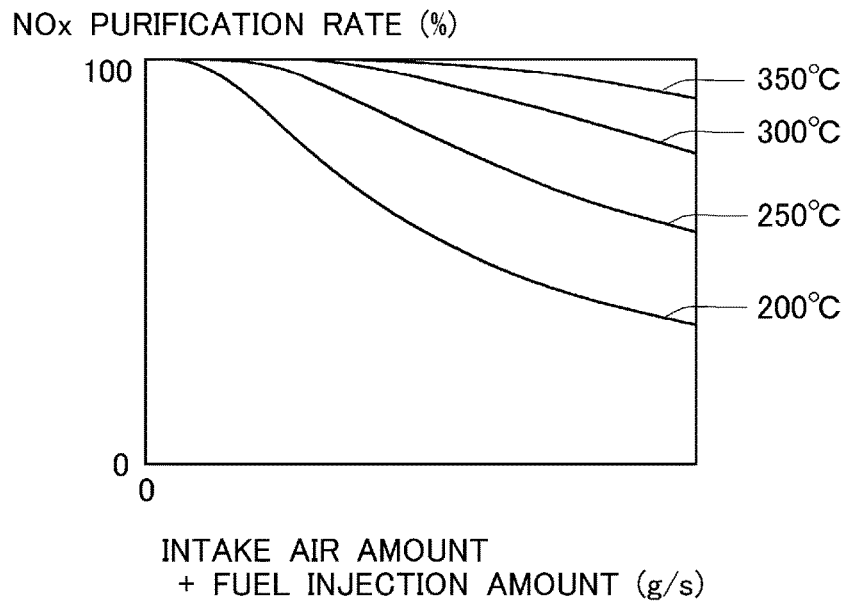
[Fig. 4]
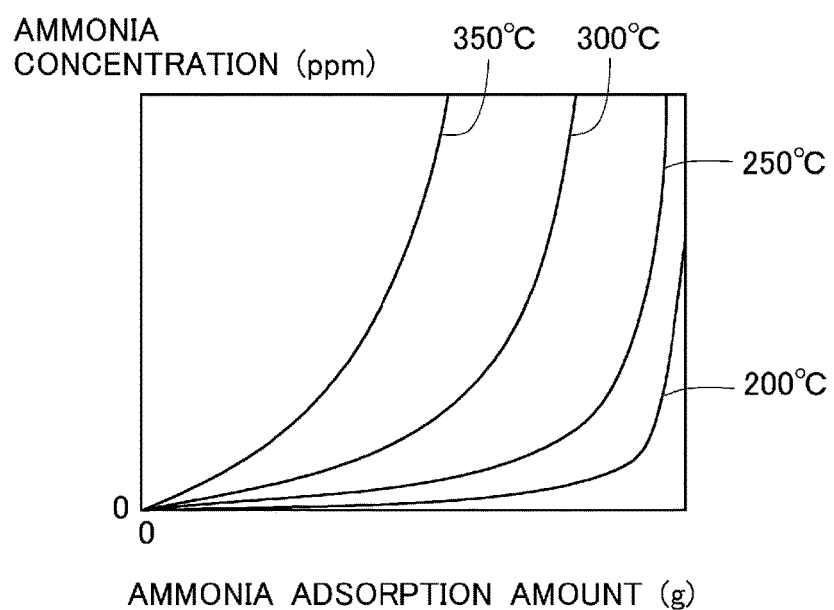

[Fig. 5]
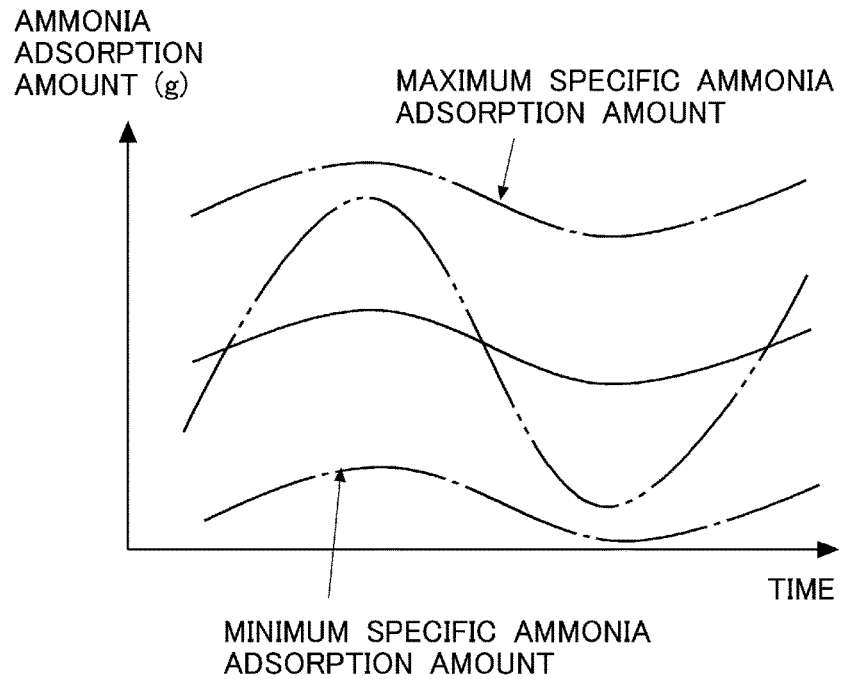
[Fig. 6]
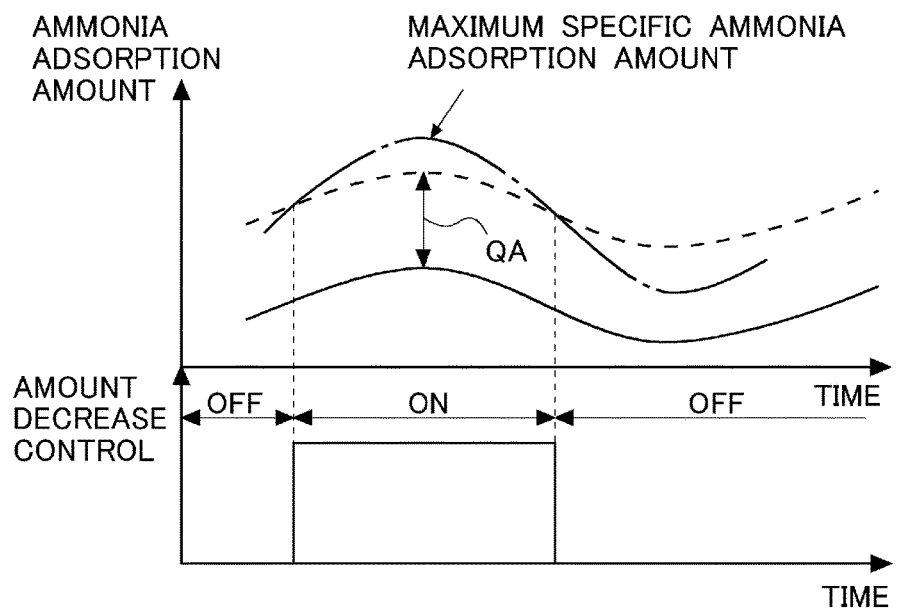

[Fig. 7]
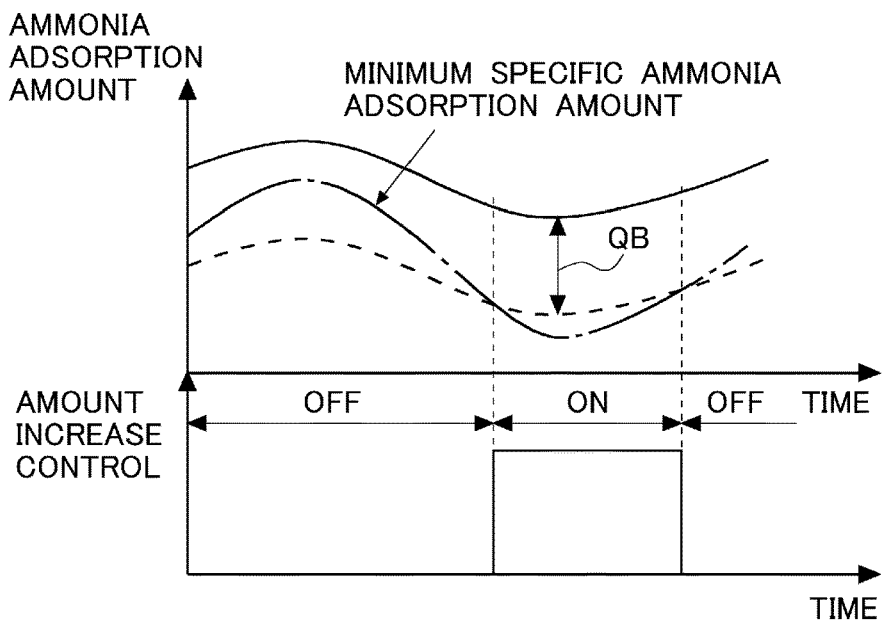
[Fig. 8]
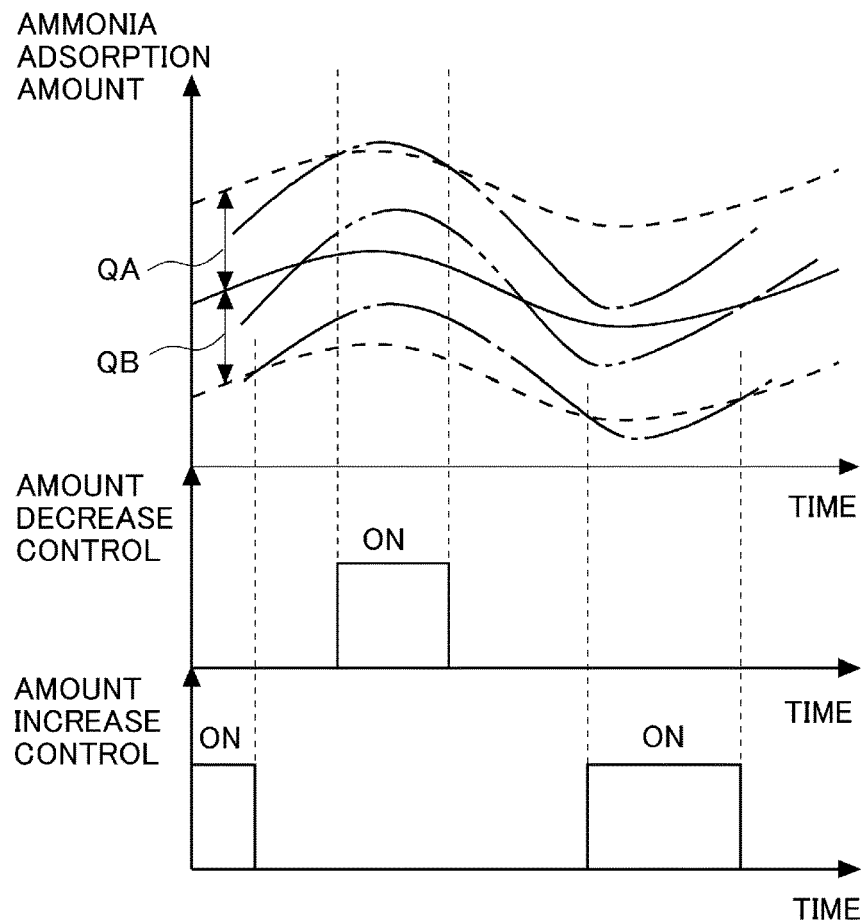

[Fig. 9]
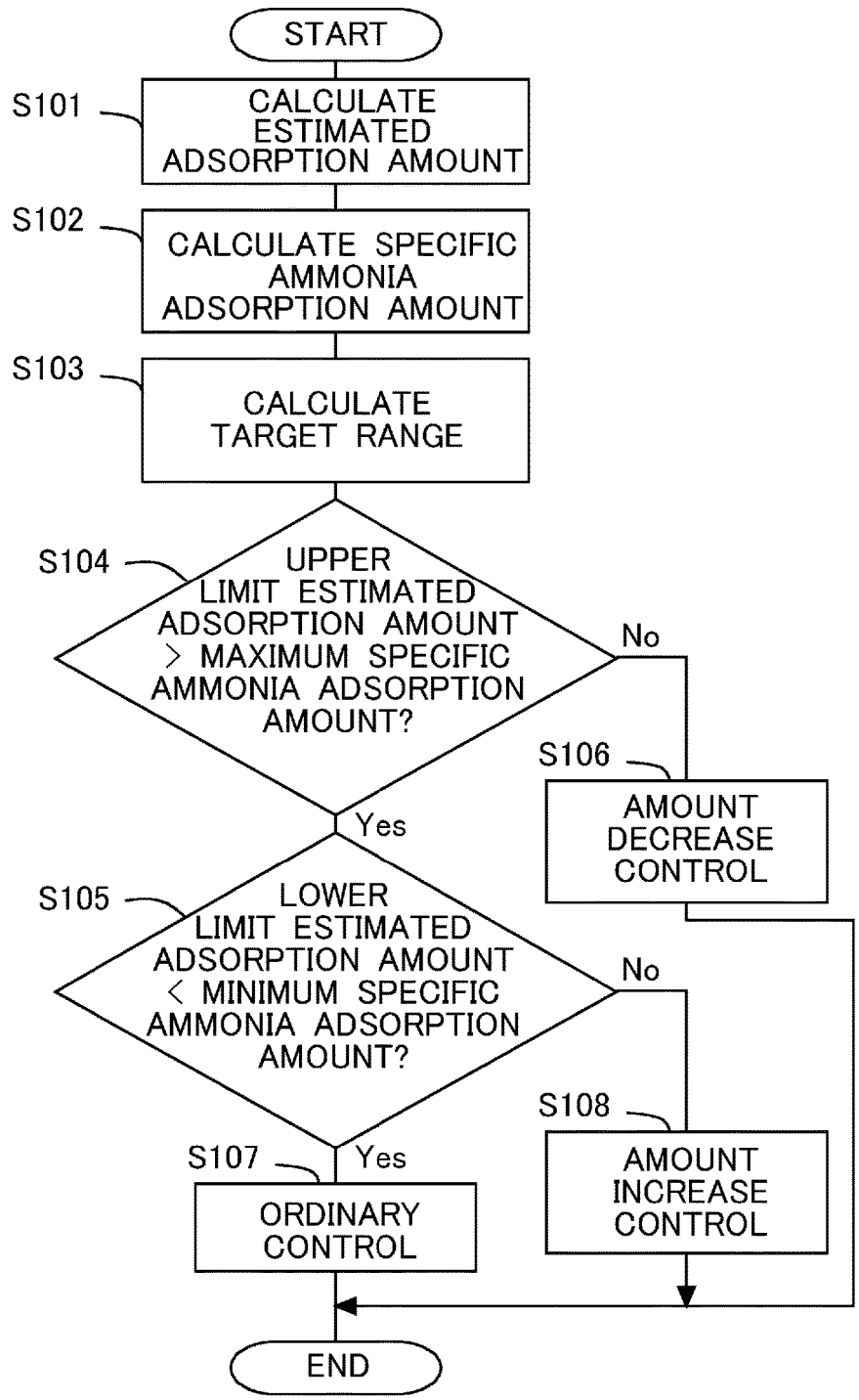

[Fig. 10]
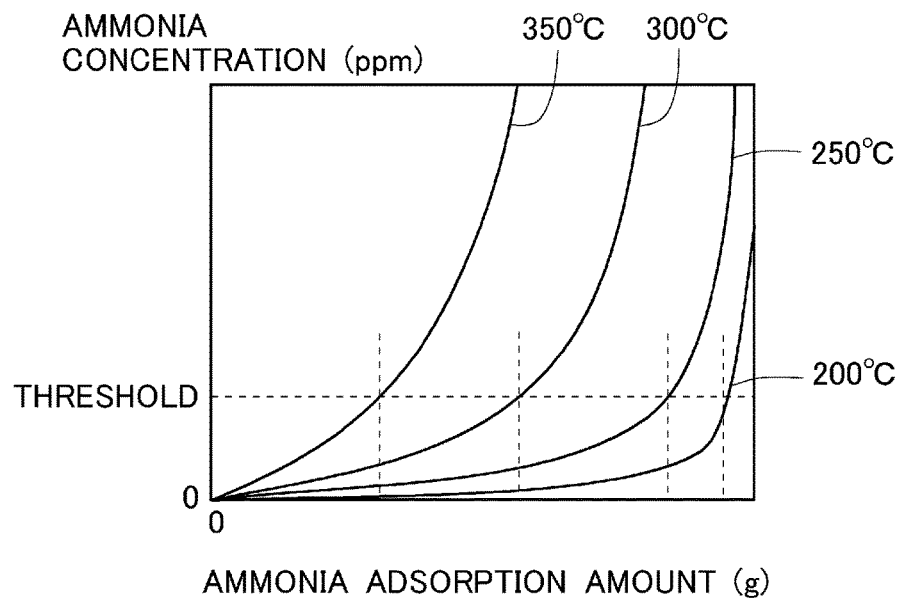
[Fig. 11]
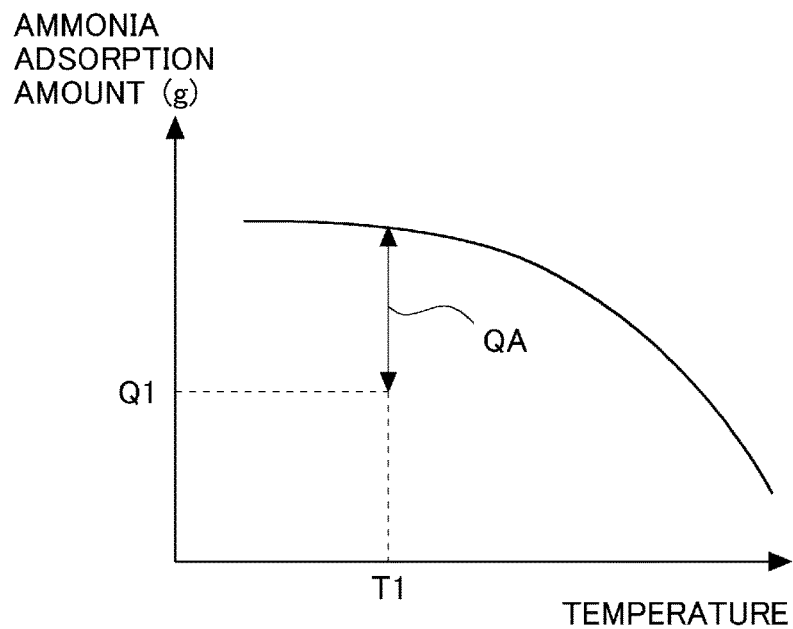

[Fig. 12]
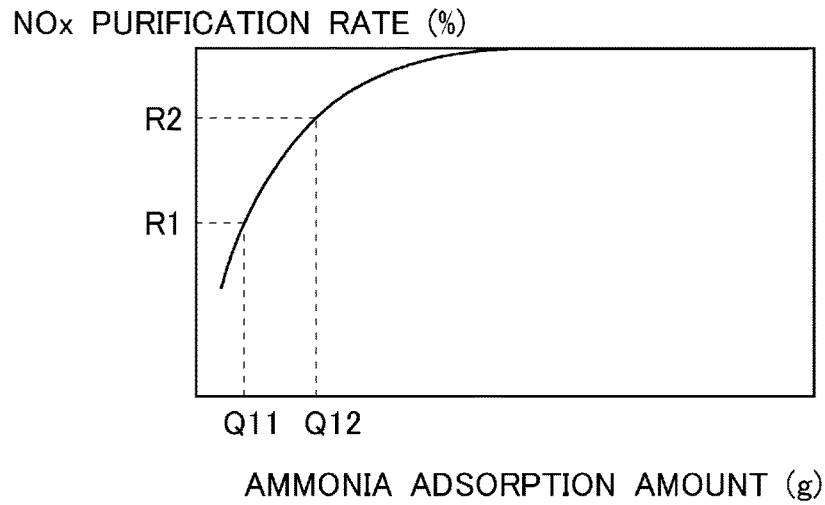
[Fig. 13]
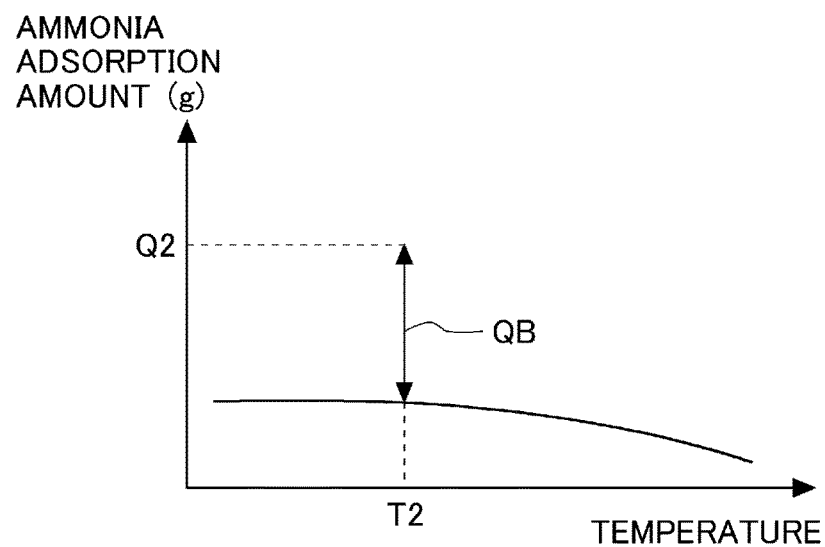

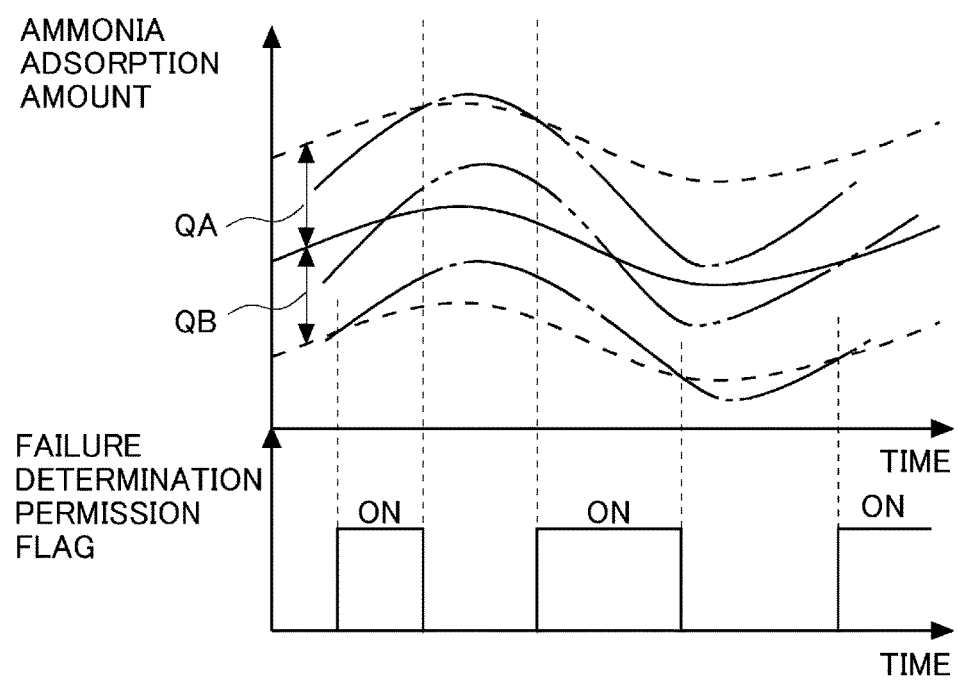

[Fig. 15]
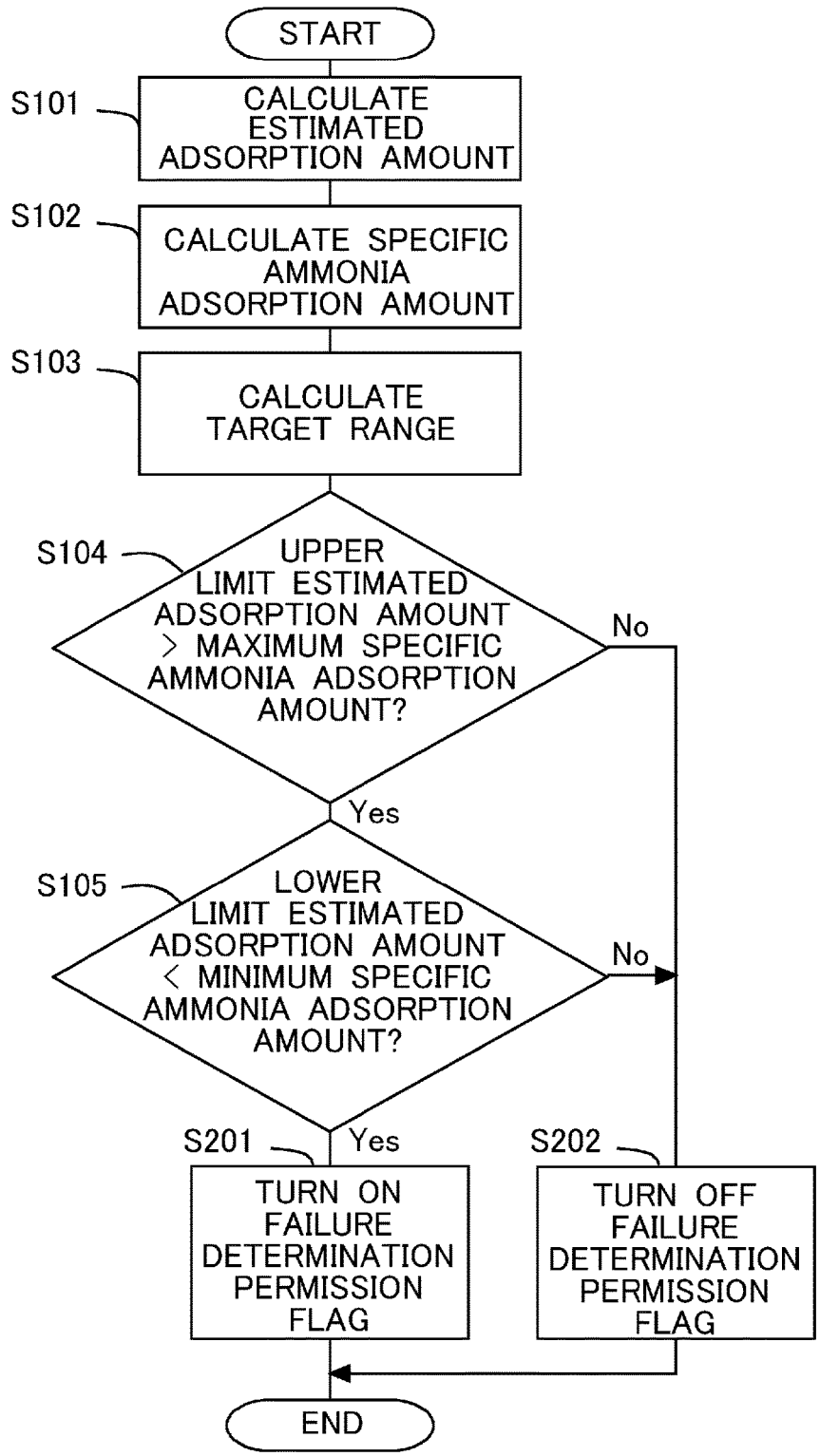

[Fig. 16]
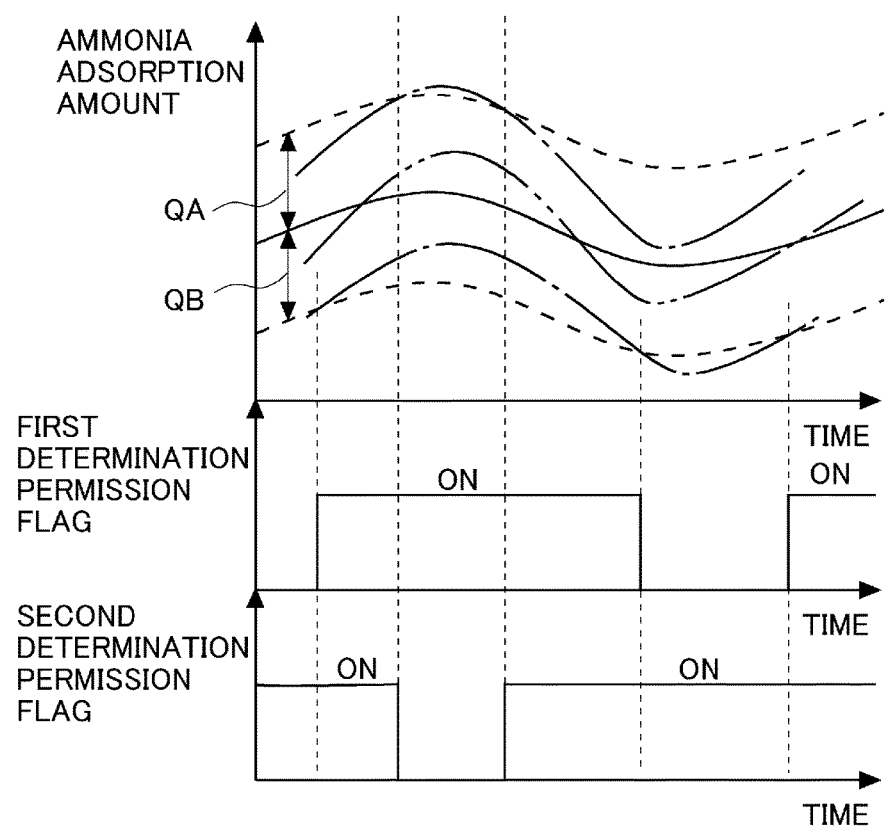

[Fig. 17]

| FIRST TIME DETERMINATION | | SECOND TIME DETERMINATION | | THIRD TIME DETERMINATION |
|---|---|---|---|---|
| FIRST DETERMINATION ⇒ NO FAILURE | CONCLUSIVELY DETERMINED NOT TO HAVE FAILED | | | |
| FIRST DETERMINATION ⇒ FAILURE | POSSIBILITY OF ERRONEOUS DETERMINATION | SECOND DETERMINATION ⇒ NO FAILURE | CONCLUSIVELY DETERMINED NOT TO HAVE FAILED | |
| | | SECOND DETERMINATION ⇒ FAILURE | POSSIBILITY OF ERRONEOUS DETERMINATION | PERFORM FIRST DETERMINATION AND SECOND DETERMINATION |
| SECOND DETERMINATION ⇒ NO FAILURE | CONCLUSIVELY DETERMINED NOT TO HAVE FAILED | | | |
| SECOND DETERMINATION ⇒ FAILURE | POSSIBILITY OF ERRONEOUS DETERMINATION | FIRST DETERMINATION ⇒ NO FAILURE | CONCLUSIVELY DETERMINED NOT TO HAVE FAILED | |
| | | FIRST DETERMINATION ⇒ FAILURE | POSSIBILITY OF ERRONEOUS DETERMINATION | PERFORM FIRST DETERMINATION AND SECOND DETERMINATION |

[Fig. 18]

| FIRST TIME DETERMINATION | | SECOND TIME DETERMINATION | | THIRD TIME DETERMINATION |
|---|---|---|---|---|
| FIRST DETERMINATION NO FAILURE | POSSIBILITY OF ERRONEOUS DETERMINATION | SECOND DETERMINATION NO FAILURE | CONCLUSIVELY DETERMINED NOT TO HAVE FAILED | |
| | | SECOND DETERMINATION FAILURE | POSSIBILITY OF ERRONEOUS DETERMINATION | PERFORM FIRST DETERMINATION AND SECOND DETERMINATION |
| FIRST DETERMINATION FAILURE | CONCLUSIVELY DETERMINED TO HAVE FAILED | | | |
| SECOND DETERMINATION NO FAILURE | CONCLUSIVELY DETERMINED NOT TO HAVE FAILED | | | |
| SECOND DETERMINATION FAILURE | POSSIBILITY OF ERRONEOUS DETERMINATION | FIRST DETERMINATION NO FAILURE | POSSIBILITY OF ERRONEOUS DETERMINATION | PERFORM FIRST DETERMINATION AND SECOND DETERMINATION |
| | | FIRST DETERMINATION FAILURE | CONCLUSIVELY DETERMINED TO HAVE FAILED | |

EXHAUST GAS PURIFICATION APPARATUS OF INTERNAL COMBUSTION ENGINE

CROSS-REFERENCE TO RELATED APPLICATIONS

This application is a national phase application of International Application No. PCT/JP2015/003923, filed Aug. 4, 2015, and claims the priority of Japanese Application No. 2014-161092, filed Aug. 7, 2014, the content of both of which is incorporated herein by reference.

TECHNICAL FIELD

The present disclosure relates to an exhaust gas purification apparatus of an internal combustion engine.

BACKGROUND ART

A selective reduction-type NOx catalyst (hereinafter, simply referred to as a "NOx catalyst") is known which purifies NOx contained in exhaust gas from an internal combustion engine using ammonia as a reducing agent. An adding valve or the like that adds ammonia or an ammonia precursor into exhaust gas is installed on an upstream side of the NOx catalyst. An ammonia precursor can be exemplified by urea. Hereinafter, an ammonia precursor or ammonia will also be collectively referred to as a "reducing agent".

In this case, in order to maintain a NOx purification rate of the NOx catalyst at a high level, a certain amount of reducing agent must be adsorbed by the NOx catalyst in advance. Therefore, supply of the reducing agent may be performed from the adding valve or the like based on a difference between an amount of the reducing agent to be adsorbed by the NOx catalyst (hereinafter, also referred to as a target adsorption amount) and an amount of the reducing agent estimated to be adsorbed by the NOx catalyst (hereinafter, also referred to as an estimated adsorption amount) (for example, refer to Patent Document 1). Moreover, a NOx purification rate is an amount of NOx purified by a NOx catalyst with respect to an amount of NOx that flows into the NOx catalyst. Alternatively, a NOx purification rate may be considered a NOx concentration in exhaust gas that is reduced due to purification by a NOx catalyst with respect to a NOx concentration in exhaust gas that flows into the NOx catalyst.

CITATION LIST

Patent Literature

[PTL 1] Japanese Patent Application Laid-open No. 2009-281350
[PTL 2] WO 2010/082307
[PTL 3] Japanese Patent Application Laid-open No. 2008-215213

SUMMARY

Technical Problem

An estimated adsorption amount is calculated using detection values of various sensors, an amount of a reducing agent supplied from an adding valve or the like, and the like. The detection values of the sensors may include errors. In addition, an amount of the reducing agent supplied from the adding valve or the like may also include an error such as an individual difference and deterioration over time. These errors may cause the estimated adsorption amount to deviate from an amount of the reducing agent that is actually adsorbed by the NOx catalyst (hereinafter, also referred to as an actual adsorption amount). Therefore, when supplying the reducing agent from the adding valve or the like based on the estimated adsorption amount, there is a possibility that a supply amount of the reducing agent may become excessively large or excessively small compared to an amount of the reducing agent necessary to maintain the NOx purification rate of the NOx catalyst at a high level.

The present disclosure has been made in consideration of the problem described above and an object thereof is to optimize an additive amount of a reducing agent to a selective reduction-type NOx catalyst.

Solution to Problem

In order to achieve the object described above, the present disclosure provides an exhaust gas purification apparatus of an internal combustion engine including:

an adding valve which is provided in an exhaust passage of the internal combustion engine and is configured to add an ammonia precursor or ammonia into the exhaust passage; and a selective reduction-type NOx catalyst which is provided in the exhaust passage on a downstream side of the adding valve and configured to selectively reduce NOx using ammonia adsorbed inside the catalyst, the exhaust gas purification apparatus of an internal combustion engine configured to control an ammonia adsorption amount of the selective reduction-type NOx catalyst by adding the ammonia precursor or ammonia using the adding valve, the exhaust gas purification apparatus of an internal combustion engine further including:

a controller programmed to:

estimate the ammonia adsorption amount based on one or a plurality of prescribed parameters related to the ammonia adsorption amount and estimate a specific ammonia adsorption amount that is an estimated value of the ammonia adsorption amount specified by at least one of a maximum value and a minimum value of an estimated value of the ammonia adsorption amount based on an error in the prescribed parameter; and when the specific ammonia adsorption amount is outside a target range of the ammonia adsorption amount, control addition of the ammonia precursor or ammonia using the adding valve so that the specific ammonia adsorption amount returns to the target range.

The prescribed parameter is a detection value of a sensor, an amount of an ammonia precursor or ammonia that is added from the adding valve, or the like. Since the prescribed parameter is related to an ammonia adsorption amount, the ammonia adsorption amount can be estimated based on the prescribed parameter. In this case, the detection value of a sensor, the amount of an ammonia precursor or ammonia that is added from the adding valve, or the like may include an error. However, it is difficult to determine how much of an error has actually occurred. A specific ammonia adsorption amount is estimated as an ammonia adsorption amount that takes this error into consideration. A maximum value of an estimated value of the ammonia adsorption amount that takes the error into consideration is a maximum value of the specific ammonia adsorption amount, and a minimum value of an estimated value of the ammonia adsorption amount that takes the error into consideration is a minimum value of the specific ammonia adsorption amount.

The specific ammonia adsorption amount can be a value that is an estimated value of an ammonia adsorption amount which may vary depending on an error of a prescribed parameter. An ammonia adsorption amount that is estimated in a case of an occurrence of the error causing the estimated value of the ammonia adsorption amount to take a maximum value is the maximum value of the specific ammonia adsorption amount. In addition, an ammonia adsorption amount that is estimated in a case of an occurrence of the error causing the estimated value of the ammonia adsorption amount to take a minimum value is the minimum value of the specific ammonia adsorption amount. Moreover, the specific ammonia adsorption amount can also be set to a value which is equal to or larger than the estimated value of the ammonia adsorption amount in a case of an occurrence of the error causing the estimated value of the ammonia adsorption amount to take a minimum value and which is equal to or smaller than the estimated value of the ammonia adsorption amount in a case of an occurrence of the error causing the estimated value of the ammonia adsorption amount to take a maximum value. While it is difficult to determine an actual ammonia adsorption amount since the prescribed parameter includes an error, the actual ammonia adsorption amount is conceivably within a range of estimated values of the ammonia adsorption amount which takes the error in the prescribed parameter into consideration. Therefore, the actual ammonia adsorption amount is conceivably between the minimum value and the maximum value of the specific ammonia adsorption amount. Moreover, hereinafter, the maximum value of the specific ammonia adsorption amount will be referred to as a maximum specific ammonia adsorption amount and the minimum value of the specific ammonia adsorption amount will be referred to as a minimum specific ammonia adsorption amount.

A target range of an ammonia adsorption amount of a selective reduction-type NOx catalyst can be set to a range that enables a required NOx purification rate to be achieved or to a range in which ammonia is prevented from flowing out from the selective reduction-type NOx catalyst.

The controller controls addition of a reducing agent by an adding valve so that at least one of the maximum specific ammonia adsorption amount falls within a target range or the minimum specific ammonia adsorption amount falls within the target range. Since the specific ammonia adsorption amount is an ammonia adsorption amount that takes an error in the prescribed parameter into consideration, if the specific ammonia adsorption amount is within the target range, the actual ammonia adsorption amount is also within the target range even if there is an error in the prescribed parameter. Therefore, since an additive amount of the reducing agent can be optimized even if the prescribed parameter includes an error, a decline in the NOx purification rate can be suppressed and ammonia can be prevented from flowing out from the selective reduction-type NOx catalyst.

In addition, the controller can reduce the amount of the ammonia precursor or ammonia added from the adding valve when a maximum value of the specific ammonia adsorption amount is larger than an upper limit value of the target range, and the controller can increase the amount of the ammonia precursor or ammonia added from the adding valve when a minimum value of the specific ammonia adsorption amount is smaller than a lower limit value of the target range.

Since the maximum specific ammonia adsorption amount can be considered a maximum value of a range in which the actual ammonia adsorption amount may vary, when the maximum specific ammonia adsorption amount is larger than the upper limit value of the target range, there is a possibility that the actual ammonia adsorption amount may exceed the target range. In this case, by reducing the additive amount of the reducing agent so that the ammonia adsorption amount decreases, the maximum specific ammonia adsorption amount can be brought within the target range. In addition, since the maximum specific ammonia adsorption amount is a maximum value of an estimated value of the ammonia adsorption amount that takes an error in the prescribed parameter into consideration, if the maximum specific ammonia adsorption amount is within the target range, the actual ammonia adsorption amount is also within the target range even if there is an error in the prescribed parameter. Accordingly, excess ammonia can be prevented from flowing out from the selective reduction-type NOx catalyst.

On the other hand, since the minimum specific ammonia adsorption amount can be considered a minimum value of a range in which the actual ammonia adsorption amount may vary, when the minimum specific ammonia adsorption amount is smaller than the lower limit value of the target range, there is a possibility that the actual ammonia adsorption amount may fall below the target range. In this case, by increasing the additive amount of the reducing agent so that the ammonia adsorption amount increases, the minimum specific ammonia adsorption amount can be brought within the target range. In addition, since the minimum specific ammonia adsorption amount is a minimum value of an estimated value of the ammonia adsorption amount that takes an error in the prescribed parameter into consideration, if the minimum specific ammonia adsorption amount is within the target range, the actual ammonia adsorption amount is also within the target range even if there is an error in the prescribed parameter. Accordingly, a decline in the NOx purification rate can be suppressed.

Furthermore, the controller can estimate an ammonia adsorption amount of the selective reduction-type NOx catalyst based on the prescribed parameter that does not take the error into consideration, and the controller can set a range of the ammonia adsorption amount including a prescribed allowable error as the target range with respect to an ammonia adsorption amount of the selective reduction-type NOx catalyst which is estimated based on the prescribed parameter that does not take the error into consideration.

A range that is allowable as an error range of the ammonia adsorption amount can be set as the prescribed allowable error. For example, the prescribed allowable error is set so that the NOx purification rate falls within an allowable range or an ammonia concentration (alternatively, an amount of ammonia) in exhaust gas that flows out from the selective reduction-type NOx catalyst falls within an allowable range. In addition, when a failure determination of the exhaust gas purification apparatus is to be performed, the prescribed allowable error may be set so that accuracy of the failure determination falls within an allowable range. Controlling addition of the reducing agent by setting a target range as described above enables an actual ammonia adsorption amount to be brought within an allowable range.

In addition, the controller can change the prescribed allowable error in accordance with a temperature of the selective reduction-type NOx catalyst.

An amount of ammonia that can be adsorbed by the selective reduction-type NOx catalyst changes in accordance with the temperature of the selective reduction-type NOx catalyst. Therefore, an allowable range of the ammonia adsorption amount of the selective reduction-type NOx catalyst may also vary in accordance with the temperature of the selective reduction-type NOx catalyst. In contrast, by changing the prescribed allowable error in accordance with the temperature of the selective reduction-type NOx catalyst, the prescribed allowable error can be varied within a range in which the ammonia adsorption amount can vary. Accordingly, ammonia can be prevented from flowing out from the selective reduction-type NOx catalyst due to the actual ammonia adsorption amount becoming excessively large and a decline in the NOx purification rate due to the actual ammonia adsorption amount becoming excessively small can be prevented.

In addition, the exhaust gas purification apparatus of an internal combustion engine includes a NOx sensor that detects a NOx concentration in exhaust gas that flows out from the selective reduction-type NOx catalyst, and the controller can calculate a NOx purification rate of the selective reduction-type NOx catalyst based on a detection value of the NOx sensor and, when both a maximum value and a minimum value of the specific ammonia adsorption amount are within the target range, the controller can perform a failure determination of the exhaust gas purification apparatus based on the NOx purification rate of the selective reduction-type NOx catalyst that is calculated based on the detection value of the NOx sensor.

Examples of a failure of the exhaust gas purification apparatus include a failure of the selective reduction-type NOx catalyst, a failure of the adding valve, and a failure of a sensor detecting NOx concentration. When the maximum specific ammonia adsorption amount is larger than the upper limit value of the target range, the ammonia adsorption amount may possibly be excessively large. Since the NOx purification rate of the selective reduction-type NOx catalyst may increase as the ammonia adsorption amount of the selective reduction-type NOx catalyst increases, even if a failure occurs in the exhaust gas purification apparatus, the NOx purification rate may increase temporarily if the ammonia adsorption amount is excessively large. In addition, when the ammonia adsorption amount is excessively large, there is a possibility that ammonia may flow out from the selective reduction-type NOx catalyst. In such a case, when a failure determination is performed based on the NOx purification rate or the like, an erroneous determination may occur. In consideration thereof, an erroneous determination can be prevented by prohibiting a failure determination when the maximum specific ammonia adsorption amount is larger than the upper limit value of the target range and performing a failure determination only when the maximum specific ammonia adsorption amount is equal to or smaller than the upper limit value of the target range.

In addition, when the minimum specific ammonia adsorption amount is smaller than the lower limit value of the target range, the ammonia adsorption amount may possibly be excessively small. Therefore, even if the exhaust gas purification apparatus has not failed, a decline in the NOx purification rate may occur. In such a case, when a failure determination is performed based on the NOx purification rate or the like, an erroneous determination may occur. In consideration thereof, an erroneous determination can be prevented by prohibiting a failure determination when the minimum specific ammonia adsorption amount is smaller than the lower limit value of the target range and performing a failure determination only when the minimum specific ammonia adsorption amount is equal to or larger than the lower limit value of the target range.

Furthermore, the exhaust gas purification apparatus of an internal combustion engine includes a NOx sensor configured to detect a NOx concentration in exhaust gas that flows out from the selective reduction-type NOx catalyst, and the controller can calculate a NOx purification rate of the selective reduction-type NOx catalyst based on a detection value of the NOx sensor and, when at least one of a maximum value and a minimum value of the specific ammonia adsorption amount is within the target range, the controller can perform a failure determination of the exhaust gas purification apparatus based on the NOx purification rate of the selective reduction-type NOx catalyst that is calculated based on the detection value of the NOx sensor.

There may be cases where it is difficult to have both the maximum specific ammonia adsorption amount and the minimum specific ammonia adsorption amount fall within the target range. In such a case, when one of the maximum specific ammonia adsorption amount and the minimum specific ammonia adsorption amount is within the target range, opportunities of performing a failure determination can be increased by performing the failure determination based on the one specific ammonia adsorption amount. Furthermore, by separately performing a failure determination when conditions are respectively satisfied with respect to the maximum specific ammonia adsorption amount and the minimum specific ammonia adsorption amount and making a final determination based on respective determination results, accuracy of the failure determination can be increased.

In addition, the controller can perform a first determination in which the failure determination is performed when a minimum value of the specific ammonia adsorption amount is larger than a lower limit value of the target range and a second determination in which the failure determination is performed when a maximum value of the specific ammonia adsorption amount is smaller than an upper limit value of the target range, and make a final determination based on a determination result of the first determination and a determination result of the second determination.

The first determination and the second determination may be performed when respective execution conditions are satisfied. Therefore, the first determination and the second determination need not be performed at the same time. Moreover, a case of preventing the exhaust gas purification apparatus from being erroneously determined to have failed even though the exhaust gas purification apparatus has not failed and a case of preventing the exhaust gas purification apparatus from being erroneously determined not to have failed even though the exhaust gas purification apparatus has failed are conceivable.

When preventing the exhaust gas purification apparatus from being erroneously determined to have failed even though the exhaust gas purification apparatus has not failed, the controller may perform a first determination in which the failure determination is performed when a minimum value of the specific ammonia adsorption amount is larger than a lower limit value of the target range and a second determination in which the failure determination is performed when a maximum value of the specific ammonia adsorption amount is smaller than an upper limit value of the target range, and conclusively determine the exhaust gas purification apparatus not to have failed when the exhaust gas purification apparatus is determined not to have failed by at least one of the first determination and the second determination.

In this case, the first determination is performed in a state where the ammonia adsorption amount is at least not excessively small. Therefore, even when the exhaust gas purification apparatus has not failed, the first determination is not performed in a state where the ammonia adsorption amount temporarily falls under the lower limit value of the target range for some reason. As a result, according to the first determination, when the exhaust gas purification apparatus has not failed and the ammonia adsorption amount temporarily falls under the lower limit value of the target range for some reason, the exhaust gas purification apparatus can be prevented from being erroneously determined to have failed.

Meanwhile, the first determination is not always performed when the ammonia adsorption amount is not excessively large. Therefore, the first determination may be performed in a state where the exhaust gas purification apparatus has not failed, the ammonia adsorption amount temporarily becomes excessively large for some reason, and ammonia flows out from the selective reduction-type NOx catalyst. When the first determination is performed in such a case, the exhaust gas purification apparatus may possibly be erroneously determined to have failed even though the exhaust gas purification apparatus has not failed. In contrast, the second determination is performed in a state where the ammonia adsorption amount is at least not excessively large. Therefore, by performing the second determination, the exhaust gas purification apparatus can be prevented from being erroneously determined to have failed when the exhaust gas purification apparatus has not failed and ammonia temporarily flows out from the selective reduction-type NOx catalyst.

However, the second determination is not always performed when the ammonia adsorption amount is not excessively small. Therefore, the second determination may be performed in a state where the exhaust gas purification apparatus has not failed, the ammonia adsorption amount temporarily becomes excessively small for some reason, and the ammonia adsorption amount falls below the lower limit value of the target range. When the second determination is performed in such a case, the exhaust gas purification apparatus may possibly be erroneously determined to have failed even though the exhaust gas purification apparatus has not failed. In contrast, the first determination is performed in a state where the ammonia adsorption amount is at least not excessively small. Therefore, the exhaust gas purification apparatus can be prevented from being erroneously determined to have failed when the exhaust gas purification apparatus has not failed and the ammonia adsorption amount is temporarily reduced.

As described above, in order to prevent the exhaust gas purification apparatus from being erroneously determined to have failed even though the exhaust gas purification apparatus has not failed, the exhaust gas purification apparatus may be determined not to have failed by at least one of the first determination and the second determination.

On the other hand, when preventing the exhaust gas purification apparatus from being erroneously determined not to have failed even though the exhaust gas purification apparatus has failed, the controller may perform a first determination in which the failure determination is performed when a minimum value of the specific ammonia adsorption amount is larger than a lower limit value of the target range and a second determination in which the failure determination is performed when a maximum value of the specific ammonia adsorption amount is smaller than an upper limit value of the target range, and conclusively determine the exhaust gas purification apparatus to have failed when the exhaust gas purification apparatus is determined to have failed by the first determination or conclusively determine the exhaust gas purification apparatus not to have failed when the exhaust gas purification apparatus is determined not to have failed by the second determination.

The first determination may be performed in a case where the exhaust gas purification apparatus has failed and the ammonia adsorption amount temporarily exceeds the upper limit value of the target range for some reason. When the first determination is performed in such a case, since the NOx purification rate of the selective reduction-type NOx catalyst is high, the exhaust gas purification apparatus may possibly be erroneously determined not to have failed even though the exhaust gas purification apparatus has failed. Therefore, when the exhaust gas purification apparatus is determined not to have failed by the first determination, since it is possible that an erroneous determination has been made, the exhaust gas purification apparatus cannot be conclusively determined not to have failed.

In contrast, the second determination is performed in a state where the ammonia adsorption amount is at least not excessively large. Therefore, the exhaust gas purification apparatus can be prevented from being erroneously determined not to have failed when the exhaust gas purification apparatus has failed and the ammonia adsorption amount is temporarily increased. Therefore, when the exhaust gas purification apparatus is determined not to have failed by the second determination, the exhaust gas purification apparatus can be conclusively determined not to have failed.

However, the second determination is not always performed when the ammonia adsorption amount is not excessively small. Therefore, the second determination may be performed in a state where the exhaust gas purification apparatus has not failed, the ammonia adsorption amount temporarily becomes excessively small for some reason, and the ammonia adsorption amount falls below the lower limit value of the target range. When the second determination is performed in such a case, the exhaust gas purification apparatus may possibly be erroneously determined to have failed even though the exhaust gas purification apparatus has not failed. Therefore, when the exhaust gas purification apparatus is determined to have failed by the second determination, since it is possible that an erroneous determination has been made, the exhaust gas purification apparatus cannot be conclusively determined to have failed.

In contrast, as described above, when the exhaust gas purification apparatus is determined to have failed by the first determination, the exhaust gas purification apparatus can be conclusively determined to have failed. Therefore, the exhaust gas purification apparatus can be prevented from being erroneously determined to have failed when the exhaust gas purification apparatus has not failed and the ammonia adsorption amount is temporarily reduced.

Advantageous Effects of Disclosure

According to the present disclosure, an additive amount of a reducing agent to a selective reduction-type NOx catalyst can be optimized.

BRIEF DESCRIPTION OF DRAWINGS

FIG. 1 is a diagram showing a schematic configuration of an internal combustion engine, and an air intake system and an exhaust system thereof, according to an embodiment;

FIG. 2 is a block diagram for obtaining an estimated adsorption amount of a NOx catalyst;

FIG. 3 is a block diagram for obtaining a NOx purification rate of a NOx catalyst;

FIG. 4 is a diagram showing a relationship among ammonia concentration in exhaust gas flowing out from a NOx catalyst, an ammonia adsorption amount of the NOx catalyst, and a temperature of the NOx catalyst;

FIG. 5 is a time chart showing a transition of an ammonia adsorption amount of a NOx catalyst;

FIG. 6 is a time chart showing transitions of an ammonia adsorption amount and a control state of amount decrease control;

FIG. 7 is a time chart showing transitions of an ammonia adsorption amount and a control state of amount increase control;

FIG. 8 is a time chart in a case where both amount increase control and amount decrease control are performed;

FIG. 9 is a flow chart showing a flow of reducing agent addition control according to a first embodiment;

FIG. 10 is a diagram showing a relationship among ammonia concentration in exhaust gas flowing out from a NOx catalyst, an ammonia adsorption amount of the NOx catalyst, and a temperature of the NOx catalyst;

FIG. 11 is a diagram showing a relationship between a temperature of a NOx catalyst and an ammonia adsorption amount when an ammonia concentration in exhaust gas flowing out from the NOx catalyst which is obtained from FIG. 10 is set as a threshold;

FIG. 12 is a diagram showing a relationship between an ammonia adsorption amount and a NOx purification rate of a NOx catalyst;

FIG. 13 is a diagram showing a relationship between a temperature of a NOx catalyst and a threshold ammonia adsorption amount;

FIG. 14 is a time chart showing transitions of an ammonia adsorption amount of a NOx catalyst and a failure determination permission flag;

FIG. 15 is a flow chart showing a flow of a failure determination of an exhaust gas purification apparatus according to a third embodiment;

FIG. 16 is a time chart showing transitions of an ammonia adsorption amount of a NOx catalyst, a first determination permission flag, and a second determination permission flag;

FIG. 17 is a diagram showing a combination of determination results of a first determination and a second determination; and FIG. 18 is another diagram showing a combination of determination results of a first determination and a second determination.

DESCRIPTION OF EMBODIMENTS

Hereinafter, modes for implementing the present disclosure will be described in detail by way of example of embodiments with reference to the drawings. However, it is to be understood that dimensions, materials, shapes, relative arrangements, and the like of components described in the embodiments are not intended to limit the scope of the disclosure thereto unless otherwise noted.

First Embodiment

FIG. 1 is a diagram showing a schematic configuration of an internal combustion engine, and an air intake system and an exhaust system thereof, according to the present embodiment. An internal combustion engine 1 is a vehicle-driving diesel engine. However, the internal combustion engine 1 may instead be a gasoline engine. An exhaust passage 2 is connected to the internal combustion engine 1. A selective reduction-type NOx catalyst 3 (hereinafter, referred to as a "NOx catalyst 3") that selectively reduces NOx in exhaust gas using ammonia as a reducing agent is provided in the exhaust passage 2.

In addition, an adding valve 4 that supplies the reducing agent is provided in the exhaust passage 2 on an upstream side of the NOx catalyst 3. Ammonia ($NH_3$) is used as the reducing agent. Moreover, the adding valve 4 may inject ammonia or may inject urea water that is a precursor of ammonia. Urea water injected from the adding valve 4 is hydrolyzed by heat of exhaust gas or heat from the NOx catalyst 3 and becomes ammonia to be adsorbed by the NOx catalyst 3. The ammonia is used as a reducing agent by the NOx catalyst 3. In other words, a substance that changes to ammonia or ammonia may be supplied from the adding valve 4. The substance that changes to ammonia or ammonia may be supplied in any of a gaseous state, a liquid state, and a solid state.

Furthermore, an upstream side NOx sensor 11 that detects NOx in exhaust gas flowing into the NOx catalyst 3 is provided on an upstream side of the NOx catalyst 3. In addition, a downstream side NOx sensor 12 that detects NOx in exhaust gas flowing out from the NOx catalyst 3 and a temperature sensor 13 that detects exhaust temperature are provided on a downstream side of the NOx catalyst 3.

An ammonia oxidizing catalyst 5 that oxidizes ammonia in exhaust gas is provided on a downstream side of the downstream side NOx sensor 12 and the temperature sensor 13.

In addition, an intake passage 6 is connected to the internal combustion engine 1. A throttle 7 that adjusts an intake air amount of the internal combustion engine 1 is provided midway along the intake passage 6. In addition, an air flow meter 16 that detects an intake air amount of the internal combustion engine 1 is attached to the intake passage 6 on an upstream side of the throttle 7.

Furthermore, an ECU 10 that is an electronic control unit is annexed to the internal combustion engine 1. The ECU 10 controls an operating state of the internal combustion engine 1, an exhaust gas purification apparatus of the internal combustion engine 1, and the like. The upstream side NOx sensor 11, the downstream side NOx sensor 12, the temperature sensor 13, and the air flow meter 16 described above as well as a crank position sensor 14 and an accelerator depression amount sensor 15 are electrically connected to the ECU 10. Accordingly, output values of the respective sensors are given to the ECU 10.

The ECU 10 is capable of determining an operating state of the internal combustion engine 1 such as an engine rotational speed based on detection by the crank position sensor 14 and an engine load based on detection by the accelerator depression amount sensor 15. Moreover, while NOx in exhaust gas flowing into the NOx catalyst 3 can be detected by the upstream side NOx sensor 11 in the present embodiment, since NOx included in exhaust gas discharged from the internal combustion engine 1 (which is exhaust gas prior to being purified by the NOx catalyst 3 and which is the exhaust gas flowing into the NOx catalyst 3) is related to an operating state of the internal combustion engine 1, the NOx in the exhaust gas flowing into the NOx catalyst 3 can also be estimated based on the operating state of the internal combustion engine 1. In addition, the ECU 10 is also capable of estimating a temperature of the NOx catalyst 3 based on an exhaust temperature detected by the temperature sensor 13. Furthermore, the ECU 10 is also capable of estimating a temperature of the NOx catalyst 3 based on an operating state of the internal combustion engine 1.

The ECU 10 estimates an adsorption amount of ammonia of the NOx catalyst 3. FIG. 2 is a block diagram for obtaining an estimated adsorption amount of the NOx catalyst 3. In the present embodiment, an estimated adsorption amount is obtained by integrating an amount of change per unit time of the ammonia adsorption amount of the NOx catalyst 3. An amount of change per unit time of the ammonia adsorption amount of the NOx catalyst 3 can be obtained by subtracting an amount of decrease per unit time of the ammonia adsorption amount from an amount of increase per unit time thereof. A reducing agent amount per unit time that is added from the adding valve 4 (a "supplied $NH_3$ amount" shown in FIG. 2) can be set as the amount of increase per unit time of the ammonia adsorption amount of the NOx catalyst 3. In addition, a reducing agent amount per unit time that is consumed by the NOx catalyst 3 (a "consumed $NH_3$ amount" shown in FIG. 2) and a reducing agent amount per unit time that is desorbed from the NOx catalyst 3 (a "desorbed $NH_3$ amount" shown in FIG. 2) can be set as the amount of decrease per unit time of the ammonia adsorption amount of the NOx catalyst 3. Furthermore, an ammonia adsorption amount (an "adsorption amount" shown in FIG. 2) at the present moment is calculated by integrating an amount of change per unit time of the ammonia adsorption amount of the NOx catalyst 3.

The reducing agent amount per unit time that is added from the adding valve 4 (the "supplied $NH_3$ amount" shown in FIG. 2) can be known in advance. Since the reducing agent amount per unit time that is consumed by the NOx catalyst 3 (the "consumed $NH_3$ amount" shown in FIG. 2) is related to the NOx purification rate of the NOx catalyst 3 (a "NOx purification rate" shown in FIG. 2), an intake air amount per unit time of the internal combustion engine 1 (an "intake air amount" shown in FIG. 2), and a NOx concentration in exhaust gas that flows into the NOx catalyst 3 (an "inflow NOx concentration" shown in FIG. 2, the reducing agent amount per unit time consumed by the NOx catalyst 3 can be calculated based on these values.

A NOx purification rate is an amount of NOx purified by the NOx catalyst 3 with respect to an amount of NOx (or a NOx concentration) in exhaust gas that flows into the NOx catalyst 3. Since a NOx purification rate is related to a temperature of the NOx catalyst 3 (a "temperature" in FIG. 2), an intake air amount per unit time of the internal combustion engine 1 (the "intake air amount" shown in FIG. 2), and an ammonia adsorption amount of the NOx catalyst 3 (an "adsorption amount previous value" in FIG. 2), the NOx purification rate can be calculated based on these values. A value obtained by a previous calculation is used as the ammonia adsorption amount of the NOx catalyst 3. FIG. 3 is a diagram for obtaining a NOx purification rate of the NOx catalyst 3. A temperature shown in FIG. 3 represents a temperature of the NOx catalyst 3. A horizontal axis represents a total amount of an intake air amount per unit time of the internal combustion engine 1 and a fuel injection amount per unit time of the internal combustion engine 1. The relationships shown in FIG. 3 exist in plurality for each ammonia adsorption amount of the NOx catalyst 3. The relationships shown in FIG. 3 can be obtained in advance by an experiment, a simulation, or the like. The relationships may be mapped in advance. In the range shown in FIG. 3, the higher the temperature of the NOx catalyst 3 or the smaller the intake air amount, the higher the NOx purification rate. In addition, the larger the ammonia adsorption amount, the higher the NOx purification rate.

Furthermore, since the reducing agent amount per unit time that is desorbed from the NOx catalyst 3 (the "desorbed $NH_3$ amount" shown in FIG. 2) is related to an ammonia concentration in exhaust gas that flows out from the NOx catalyst 3 (an "outflow $NH_3$ amount" shown in FIG. 2) and an intake air amount per unit time of the internal combustion engine 1 (the "intake air amount" shown in FIG. 2), the reducing agent amount per unit time desorbed from the NOx catalyst 3 can be calculated based on these values. Since the ammonia concentration in exhaust gas that flows out from the NOx catalyst 3 is related to a temperature of the NOx catalyst 3 (the "temperature" in FIG. 2) and an ammonia adsorption amount of the NOx catalyst 3 (the "adsorption amount previous value" in FIG. 2), the ammonia concentration in exhaust gas that flows out from the NOx catalyst 3 can be calculated based on these values. Moreover, a value obtained by a previous calculation is used as the ammonia adsorption amount of the NOx catalyst 3. FIG. 4 is a diagram showing a relationship among ammonia concentration in exhaust gas flowing out from the NOx catalyst 3 (vertical axis), an ammonia adsorption amount of the NOx catalyst 3 (horizontal axis), and a temperature of the NOx catalyst 3. In the range shown in FIG. 4, the larger the ammonia adsorption amount or the higher the temperature of the NOx catalyst 3, the higher the ammonia concentration in exhaust gas flowing out from the NOx catalyst 3. According to this relationship, the ammonia concentration in exhaust gas flowing out from the NOx catalyst 3 can be obtained. The relationships shown in FIG. 4 can be obtained in advance by an experiment, a simulation, or the like. The relationships may be mapped in advance.

As described above, an amount of change per unit time of an ammonia adsorption amount of the NOx catalyst 3 can be calculated. By integrating this value, an ammonia adsorption amount at the present moment can be calculated. Alternatively, the ammonia adsorption amount at the present moment can also be calculated by calculating an amount of change of the ammonia adsorption amount per computing period of the ECU 10 and integrating the amount of change.

An ammonia adsorption amount (an estimated adsorption amount) that is estimated as described above is calculated based on detection values of sensors and a control target value of an additive amount of the reducing agent from the adding valve 4. However, detection values of sensors and an additive amount of the reducing agent from the adding valve 4 may contain errors. Therefore, there may be cases where the estimated adsorption amount deviates from an actual adsorption amount. Accordingly, there is a possibility that an excess or a shortage of the reducing agent may occur when a reducing agent supplying unit from the adding valve 4 is determined based on the estimated adsorption amount.

In contrast, in the present embodiment, a specific ammonia adsorption amount that is an ammonia adsorption amount containing the error described above is estimated. The specific ammonia adsorption amount is an ammonia adsorption amount which is equal to or smaller than an ammonia adsorption amount in a case of an occurrence of an error that causes a maximum ammonia adsorption amount to be estimated and which is equal to or larger than an ammonia adsorption amount in a case of an occurrence of an error that causes a minimum ammonia adsorption amount to be estimated. In other words, the specific ammonia adsorption amount has width. In the following description, a specific ammonia adsorption amount in a case of an occurrence of an error that causes a maximum ammonia adsorption amount to be estimated will be referred to as a maximum specific ammonia adsorption amount. In addition, in the following description, a specific ammonia adsorption amount in a case of an occurrence of an error that causes a minimum ammonia adsorption amount to be estimated will be referred to as a minimum specific ammonia adsorption amount. In other words, the maximum specific ammonia adsorption amount is a maximum value of the estimated adsorption amount that takes the error described above into consideration and the minimum specific ammonia adsorption amount is a minimum value of the estimated adsorption amount that takes the error described above into consideration. The maximum specific ammonia adsorption amount can also be considered an upper limit value of values which an actual adsorption amount may take. On the other hand, the minimum specific ammonia adsorption amount can also be considered a lower limit value of values which the actual adsorption amount may take.

The maximum specific ammonia adsorption amount and the minimum specific ammonia adsorption amount may be calculated in consideration of detection errors of the upstream side NOx sensor 11, the temperature sensor 13, the air flow meter 16, and the like and an error in an additive amount by the adding valve 4. Alternatively, the maximum specific ammonia adsorption amount and the minimum specific ammonia adsorption amount may be obtained by an experiment. Moreover, in the present embodiment, the ECU 10 that estimates a specific ammonia adsorption amount corresponds to the controller according to the present disclosure.

An error that causes a maximum ammonia adsorption amount to be estimated may occur, for example, in a case where a reducing agent amount per unit time that is added from the adding valve 4 is larger than a control target value, in a case where reducing agent concentration is higher than a control target value, in a case where a detection value of the temperature sensor 13 is higher than reality, in a case where an intake air amount per unit time of the internal combustion engine 1 which is detected by the air flow meter 16 is larger than reality, and in a case where NOx concentration in exhaust gas detected by the upstream side NOx sensor 11 is lower than reality. When the respective values deviate in an opposite direction, an error that causes a minimum ammonia adsorption amount to be estimated occurs.

When the reducing agent amount per unit time that is added from the adding valve 4 is larger than a control target value or when the reducing agent concentration is higher than a control target value, since an amount of the reducing agent supplied to the NOx catalyst 3 becomes excessively large, the actual adsorption amount increases. In addition, when the detection value of the temperature sensor 13 is larger than reality, since an estimated NOx purification rate becomes higher than reality and a larger amount of the reducing agent is to be added, the actual adsorption amount increases. Furthermore, when the detection value of the temperature sensor 13 is larger than reality, since an estimated value of a reducing agent amount per unit time that is desorbed from the NOx catalyst 3 becomes higher than reality and a larger amount of the reducing agent is to be added, the actual adsorption amount increases.

In addition, when an intake air amount per unit time of the internal combustion engine 1 detected by the air flow meter 16 is larger than reality, since an amount of NOx that flows into the NOx catalyst 3 is estimated to increase and a larger amount of the reducing agent is to be added, the actual adsorption amount increases. Furthermore, when NOx concentration in exhaust gas detected by the upstream side NOx sensor 11 is smaller than reality, since a reducing agent additive amount from the adding valve 4 becomes excessive, the actual adsorption amount increases.

The tendencies of errors described above are merely examples and different tendencies may be exhibited depending on conditions. Moreover, in the present embodiment, a reducing agent amount per unit time that is added from the adding valve 4, a reducing agent concentration, a detection value of the upstream side NOx sensor 11, a detection value of the temperature sensor 13, a detection value of the air flow meter 16, and the like correspond to the prescribed parameters according to the present disclosure.

FIG. 5 is a time chart showing a transition of an ammonia adsorption amount of the NOx catalyst 3. A solid line indicates an estimated adsorption amount that does not take errors into consideration, a one-dot chain line indicates a maximum specific ammonia adsorption amount and a minimum specific ammonia adsorption amount, and a two-dot chain line indicates an actual ammonia adsorption amount. Moreover, the actual ammonia adsorption amount is a value that cannot be determined by the ECU 10. The actual ammonia adsorption amount is within a range of the minimum specific ammonia adsorption amount or higher and the maximum specific ammonia adsorption amount or lower.

In addition, in the present embodiment, the reducing agent additive amount from the adding valve 4 is adjusted on the assumption that the actual ammonia adsorption amount is within a range of the minimum specific ammonia adsorption amount or higher and the maximum specific ammonia adsorption amount or lower. In this case, the reducing agent additive amount from the adding valve 4 is adjusted so that the minimum specific ammonia adsorption amount or the maximum specific ammonia adsorption amount is within a target range. The target range may be an allowable range. Moreover, in the present embodiment, the ECU 10 that controls addition of the reducing agent by the adding valve 4 when the specific ammonia adsorption amount is outside of the target range so that the specific ammonia adsorption amount returns to the target range corresponds to the controller according to the present disclosure.

FIG. 6 is a time chart showing transitions of an ammonia adsorption amount and a control state of amount decrease control. A solid line among the ammonia adsorption amount indicates an estimated adsorption amount and a one-dot chain line indicates a maximum specific ammonia adsorption amount. In addition, QA in FIG. 6 denotes an allowable positive side error. In other words, an upper limit estimated adsorption amount indicated by a dashed line is an upper limit value of a target range (an allowable range may be adopted instead) of the ammonia adsorption amount. Hereinafter, "estimated adsorption amount+QA" will be referred to as an upper limit estimated adsorption amount. When amount decrease control is on, the reducing agent additive amount from the adding valve 4 is reduced when the amount decrease control is performed. When amount decrease control is off, an ordinary reducing agent additive amount is used. An ordinary reducing agent additive amount as referred to herein may be a reducing agent additive amount in accordance with an estimated adsorption amount.

When the maximum specific ammonia adsorption amount is larger than the upper limit estimated adsorption amount, since there is a possibility that the actual adsorption amount may become excessively large, amount decrease control is performed. Subsequently, when the maximum specific ammonia adsorption amount falls to or below the upper limit estimated adsorption amount, the amount decrease control is ended. In other words, when the maximum specific ammonia adsorption amount at each time point exceeds the target range, reducing agent supply by the adding valve 4 is controlled so that the maximum specific ammonia adsorption amount returns to the target range. Accordingly, even if the estimated adsorption amount deviates from the actual adsorption amount, the actual adsorption amount can be kept within the target range.

Moreover, when the reducing agent additive amount from the adding valve 4 is reduced in the amount decrease control, the reducing agent additive amount may be brought lower than an ordinary reducing agent additive amount or may be brought lower than a previous reducing agent additive amount. In addition, in amount decrease control, the reducing agent additive amount from the adding valve 4 may be reduced by a prescribed proportion or may be reduced by a prescribed amount. Furthermore, the reducing agent additive amount may be further reduced as a difference between the maximum specific ammonia adsorption amount and the upper limit estimated adsorption amount increases.

On the other hand, FIG. 7 is a time chart showing transitions of an ammonia adsorption amount and a control state of amount increase control. A solid line among the ammonia adsorption amount indicates an estimated adsorption amount and a one-dot chain line indicates a minimum specific ammonia adsorption amount. In addition, QB in FIG. 7 denotes an allowable negative side error. In other words, a lower limit estimated adsorption amount indicated by a dashed line is a lower limit value of a target range (an allowable range may be adopted instead) of the ammonia adsorption amount. Hereinafter, "estimated adsorption amount—QB" will be referred to as a lower limit estimated adsorption amount. When amount increase control is on, the reducing agent additive amount from the adding valve 4 is increased when the amount increase control is performed. In addition, when amount increase control is off, an ordinary reducing agent additive amount is used.

When the minimum specific ammonia adsorption amount is smaller than the lower limit estimated adsorption amount, since there is a possibility that the actual adsorption amount may become excessively small, amount increase control is performed. Subsequently, when the minimum specific ammonia adsorption amount rises to or above the lower limit estimated adsorption amount, the amount increase control is ended. In other words, when the minimum specific ammonia adsorption amount at each time point is below the target range, reducing agent supply by the adding valve 4 is controlled so that the minimum specific ammonia adsorption amount returns to the target range. Accordingly, even if the estimated adsorption amount deviates from the actual adsorption amount, the actual adsorption amount can be kept within the target range.

Moreover, when the reducing agent additive amount from the adding valve 4 is increased in the amount increase control, the reducing agent additive amount may be brought higher than an ordinary reducing agent additive amount or may be brought higher than a previous reducing agent additive amount. In addition, in the amount increase control described above, the reducing agent additive amount from the adding valve 4 may be increased by a prescribed proportion or may be increased by a prescribed amount. Furthermore, the reducing agent additive amount may be further increased as a difference between the lower limit estimated adsorption amount and the minimum specific ammonia adsorption amount increases.

FIG. 8 is a time chart in a case where both amount increase control and amount decrease control are performed.

As described above, when the maximum specific ammonia adsorption amount is larger than the upper limit estimated adsorption amount, amount decrease control may be performed, and when the minimum specific ammonia adsorption amount is smaller than the lower limit estimated adsorption amount, amount increase control may be performed. In other words, the upper limit estimated adsorption amount may be set as an upper limit value of the target range and the lower limit estimated adsorption amount may be set as a lower limit value of the target range. Since the maximum specific ammonia adsorption amount that may be a maximum value of the actual adsorption amount and the minimum specific ammonia adsorption amount that may be a minimum value of the actual adsorption amount are kept within an allowable range even if the actual adsorption amount is unknown, the actual adsorption amount can be brought within an allowable range.

Moreover, while an upper limit estimated adsorption amount and a lower limit estimated adsorption amount are indicated using an estimated adsorption amount as a reference in the present embodiment, the upper limit estimated adsorption amount and the lower limit estimated adsorption amount may be obtained by an experiment, a simulation, or the like as an upper limit value and a lower limit value of a target range of the actual adsorption amount. In this case, an estimated adsorption amount need not be used. In addition, the allowable positive side error QA and the allowable negative side error QB in the present embodiment correspond to the prescribed allowable error according to the present disclosure.

FIG. 9 is a flow chart showing a flow of reducing agent addition control according to the present embodiment. The present flow chart is repetitively performed every prescribed period of time by the ECU 10.

In step S101, an estimated adsorption amount at the present moment is calculated. The estimated adsorption amount is calculated by successively integrating an amount of change of an ammonia adsorption amount of the NOx catalyst 3. In present step S101, an estimated adsorption amount that does not take the errors described above into consideration is calculated.

In step S102, a maximum specific ammonia adsorption amount and a minimum specific ammonia adsorption amount at the present moment are calculated. In present step S102, in consideration of errors in sensors or an additive amount error of the adding valve 4, a maximum specific ammonia adsorption amount that is a specific ammonia adsorption amount in a case of an occurrence of an error that causes a maximum ammonia adsorption amount to be estimated and a minimum specific ammonia adsorption amount that is a specific ammonia adsorption amount in a case of an occurrence of an error that causes a minimum ammonia adsorption amount to be estimated are calculated. Alternatively, the maximum specific ammonia adsorption amount and the minimum specific ammonia adsorption amount can be obtained in advance by an experiment, a simulation, or the like.

In step S103, a target range of an ammonia adsorption amount at the present moment is calculated. In present step S103, an allowable positive side error QA and an allowable negative side error QB are calculated. In addition, an ammonia adsorption amount obtained by adding the allowable positive side error QA to the estimated adsorption amount is adopted as a maximum value of the target range (upper limit estimated adsorption amount). Furthermore, an ammonia adsorption amount obtained by subtracting the allowable negative side error QB from the estimated adsorption amount is adopted as a minimum value of the target range (lower limit estimated adsorption amount). Alternatively, the target range of the ammonia adsorption amount can be obtained in advance by an experiment, a simulation, or the like.

In step S104, a determination is made on whether or not the upper limit estimated adsorption amount is larger than the maximum specific ammonia adsorption amount. In present step S104, a determination is made on whether or not an ammonia adsorption amount is within the target range even when an error that causes a maximum ammonia adsorption amount to be estimated occurs. When a positive determination is made in step S104, the flow proceeds to step S105. On the other hand, when a negative determination is made in step S104, the flow proceeds to step S106 and amount decrease control is performed.

In step S105, a determination is made on whether or not the lower limit estimated adsorption amount is smaller than the minimum specific ammonia adsorption amount. In present step S105, a determination is made on whether or not an ammonia adsorption amount is within the target range even when an error that causes a minimum ammonia adsorption amount to be estimated occurs. When a positive determination is made in step S105, the flow proceeds to step S107 and ordinary control is performed. On the other hand, when a negative determination is made in step S105, the flow proceeds to step S108 and amount increase control is performed. By repetitively executing the flow chart shown in FIG. 9, the specific ammonia adsorption amount can be brought within the target range.

Moreover, ordinary control according to the present embodiment is performed so that, for example, an estimated adsorption amount equals a prescribed amount. In other words, when the estimated adsorption amount decreases, the reducing agent is added from the adding valve 4 to increase the estimated adsorption amount. The addition of the reducing agent from the adding valve 4 is ended once the estimated adsorption amount reaches a prescribed amount. The increase control increases an additive amount of the reducing agent by extending an addition time of the reducing agent as compared to ordinary control. In addition, the decrease control reduces an additive amount of the reducing agent by reducing an addition time of the reducing agent as compared to ordinary control. Alternatively, in increase control, a reducing agent additive amount may be increased by increasing pressure of the reducing agent that is added from the adding valve 4. Furthermore, in decrease control, a reducing agent additive amount may be reduced by reducing pressure of the reducing agent that is added from the adding valve 4.

As described above, according to the present embodiment, a reducing agent additive amount from the adding valve 4 can be adjusted to bring an actual adsorption amount within an allowable range. Accordingly, the actual adsorption amount can be optimized.

In addition, while performing feedback control of a reducing agent additive amount based on NOx concentration on a downstream side of the NOx catalyst 3 is conventionally known, according to the present embodiment, since detecting the NOx concentration on the downstream side of the NOx catalyst 3 is not essential, there is no need to provide a NOx sensor on the downstream side of the NOx catalyst 3.

Second Embodiment

When the allowable positive side error QA is not optimal, there is a possibility that an ammonia adsorption amount of the NOx catalyst 3 may become excessively large and ammonia may be desorbed from the NOx catalyst 3 when the temperature of the NOx catalyst 3 rises or the like. In addition, when the allowable negative side error QB is not optimal, there is a possibility that an ammonia adsorption amount of the NOx catalyst 3 may become excessively small and a NOx purification rate of the NOx catalyst 3 may decline. The allowable positive side error QA and the allowable negative side error QB may vary depending on the temperature of the NOx catalyst 3 or the like. Therefore, in the present embodiment, the allowable positive side error QA and the allowable negative side error QB are changed based on the temperature of the NOx catalyst 3 or the like. This change is performed in step S103 described earlier. Since other devices and the like are the same as those of the first embodiment, a description thereof will be omitted.

FIG. 10 is a diagram similar to FIG. 4 showing a relationship among ammonia concentration in exhaust gas flowing out from the NOx catalyst 3 (vertical axis), an ammonia adsorption amount of the NOx catalyst 3 (horizontal axis), and a temperature of the NOx catalyst 3. As shown in FIG. 10, if the ammonia adsorption amount of the NOx catalyst 3 is the same, the higher the temperature of the NOx catalyst 3, the higher the ammonia concentration in exhaust gas flowing out from the NOx catalyst 3. Since the ammonia concentration in exhaust gas flowing out from the NOx catalyst 3 has an allowable range, in the present embodiment, the allowable positive side error QA is set so that the ammonia concentration in exhaust gas flowing out from the NOx catalyst 3 does not exceed an upper limit of the allowable range. In FIG. 10, an upper limit value of the allowable range of the ammonia concentration in exhaust gas flowing out from the NOx catalyst 3 is adopted as a threshold.

According to FIG. 10, an ammonia adsorption amount at a point where the ammonia concentration in exhaust gas flowing out from the NOx catalyst 3 equals a threshold (hereinafter, also referred to as a threshold ammonia adsorption amount) can be obtained for each temperature of the NOx catalyst 3.

FIG. 11 is a diagram showing a relationship between a temperature of the NOx catalyst 3 and a threshold ammonia adsorption amount. For example, if Q1 denotes an estimated adsorption amount at a temperature of the NOx catalyst 3 denoted by T1, a difference between the threshold ammonia adsorption amount and the estimated adsorption amount Q1 is the allowable positive side error QA. Moreover, to allow for a certain amount of margin, a value that is smaller or larger than the difference between the threshold ammonia adsorption amount and the estimated adsorption amount Q1 may be adopted as the allowable positive side error QA.

By setting the allowable positive side error QA in accordance with the temperature of the NOx catalyst 3 in this manner, since a positive side error QA can be set based on ease of desorption of ammonia from the NOx catalyst 3, the ammonia concentration in exhaust gas flowing out from the NOx catalyst 3 can be brought within an allowable range.

Alternatively, the threshold ammonia adsorption amount may be set to an upper limit value of the target range of the ammonia adsorption amount. In this case, the estimated adsorption amount Q1 and the allowable positive side error QA need not be obtained.

In addition, when the ammonia oxidizing catalyst 5 reaches a high temperature, ammonia desorbed from the NOx catalyst 3 is oxidized by the ammonia oxidizing catalyst 5 and NOx is generated. Therefore, NOx may possibly be discharged into the atmosphere. In consideration thereof, in the present embodiment, the allowable positive side error QA may be set so that an amount of NOx generated by the ammonia oxidizing catalyst 5 or NOx concentration in exhaust gas flowing out from the ammonia oxidizing catalyst 5 is within an allowable range. There is a correlation between the ammonia concentration in exhaust gas flowing out from the NOx catalyst 3 and concentration of NOx that is generated by the ammonia oxidizing catalyst 5. Therefore, an ammonia concentration that causes the concentration of NOx generated by the ammonia oxidizing catalyst 5 to fall within an allowable range is set as a threshold and the allowable positive side error QA is set so that the ammonia concentration in exhaust gas flowing out from the NOx catalyst 3 equals or falls below the threshold. The allowable positive side error QA in this case is obtained using FIGS. 10 and 11. In other words, in FIG. 10, an ammonia concentration that causes the concentration of NOx generated by the ammonia oxidizing catalyst 5 to equal an upper limit of the allowable range is set as a threshold. An ammonia adsorption amount that produces this threshold is obtained for each temperature of the NOx catalyst 3. Subsequently, as shown in FIG. 11, a relationship between a temperature of the NOx catalyst 3 and a threshold ammonia adsorption amount is obtained. As a result, the positive side error QA can be obtained based on the temperature T1 of the NOx catalyst 3 and the estimated adsorption amount Q1. In this manner, even when there are errors in sensors or the like, the NOx concentration in exhaust gas flowing out into the atmosphere can be brought within an allowable range.

Meanwhile, the upstream side NOx sensor 11 and the downstream side NOx sensor 12 also detect ammonia in a similar manner to NOx. Therefore, when a NOx purification rate of the NOx catalyst 3 is obtained based on detection values of the upstream side NOx sensor 11 and the downstream side NOx sensor 12 when ammonia is present in exhaust gas, there is a possibility that the NOx purification rate cannot be correctly obtained. If the NOx purification rate is not correctly obtained, there is a possibility that an erroneous determination may occur in a failure determination of the exhaust gas purification apparatus using the NOx purification rate.

For example, when ammonia from the NOx catalyst 3 flows out, a calculated NOx purification rate decreases since the detection value of the downstream side NOx sensor 12 increases. Therefore, there is a possibility that an erroneous determination that a NOx purification performance of the NOx catalyst 3 has declined may be made.

In consideration thereof, in the present embodiment, the allowable positive side error QA may be set so that an erroneous determination is not made in a failure determination of the exhaust gas purification apparatus or an accuracy of the failure determination is within an allowable range. In this case, the threshold set in FIG. 10 is set to a value that prevents an erroneous determination from being made in a failure determination of the exhaust gas purification apparatus or causes the accuracy of the failure determination to fall within an allowable range. In this manner, even if there are errors in the sensors or the like, an erroneous determination can be prevented from being made in a failure determination of the exhaust gas purification apparatus.

In addition, the allowable negative side error QB may be set so that a NOx purification rate of the NOx catalyst 3 or an accuracy of a failure determination of the exhaust gas purification apparatus is within an allowable range. FIG. 12 is a diagram showing a relationship between an ammonia adsorption amount of the NOx catalyst 3 and a NOx purification rate. A NOx purification rate when the accuracy of a failure determination of the exhaust gas purification apparatus is equal to a lower limit of an allowable range is denoted by R1 and a lower limit value of a NOx purification rate required for the NOx catalyst 3 is denoted by R2. Q11 denotes an ammonia adsorption amount corresponding to the NOx purification rate denoted by R1 and Q12 denotes an ammonia adsorption amount corresponding to the NOx purification rate denoted by R2. In other words, a lower limit value of the ammonia adsorption amount when performing a failure determination of the exhaust gas purification apparatus can be adopted as R1. In addition, a lower limit value of an allowable range of the NOx purification rate when NOx is purified by the NOx catalyst 3 can be adopted as R2. An ammonia adsorption amount when the NOx purification rate equals R1 or R2 (hereinafter, also referred to as a threshold ammonia adsorption amount) can be obtained for each temperature of the NOx catalyst 3.

In addition, FIG. 13 is a diagram showing a relationship between a temperature of the NOx catalyst 3 and a threshold ammonia adsorption amount. For example, if Q2 denotes an estimated adsorption amount at a temperature denoted by T2, a difference between the estimated adsorption amount Q2 and the threshold ammonia adsorption amount is the allowable negative side error QB. Moreover, to allow for a certain amount of margin, a value that is smaller or larger than the difference between the estimated adsorption amount Q2 and the threshold ammonia adsorption amount may be adopted as the allowable negative side error QB. Accordingly, even if there are errors in the sensors and the like, NOx can be prevented from flowing out from the NOx catalyst 3 and accuracy of a failure determination of the exhaust gas purification apparatus can be improved.

Third Embodiment

In the present embodiment, a condition for performing a failure determination of the exhaust gas purification apparatus is set. Since other devices and the like are the same as those of the first embodiment, a description thereof will be omitted. A failure determination of the exhaust gas purification apparatus includes a failure determination of the NOx catalyst 3, a failure determination of the adding valve 4, a failure determination of the upstream side NOx sensor 11, and a failure determination of the downstream side NOx sensor 12. When performing a failure determination of the exhaust gas purification apparatus according to the present embodiment, for devices other than those that are objects of the failure determination, an absence of a failure may be confirmed in advance using other conventional art.

An ammonia adsorption performance and a NOx purification performance decline as deterioration of the NOx catalyst 3 progresses. In addition, as ammonia adsorption performance declines, an amount of ammonia flowing out from the NOx catalyst 3 increases. In addition, as NOx purification performance declines, an amount of NOx flowing out from the NOx catalyst 3 increases. Therefore, NOx concentration and ammonia concentration in exhaust gas on a downstream side of the NOx catalyst 3 increase as the NOx catalyst 3 deteriorates.

The ECU 10 calculates the NOx purification rate of the NOx catalyst 3 based on detection values of the upstream side NOx sensor 11 and the downstream side NOx sensor 12. In addition, the exhaust gas purification apparatus is determined not to have failed when the NOx purification rate is equal to or higher than a threshold and determined to have failed when the NOx purification rate is lower than the threshold. The threshold is set as a lower limit value of the NOx purification rate when the exhaust gas purification apparatus has not failed. Moreover, a determination of whether or not there is a failure in the exhaust gas purification apparatus can also be performed by other methods.

The NOx purification rate according to the present embodiment is calculated as a ratio of NOx concentration that decreases at the NOx catalyst 3 with respect to NOx concentration in exhaust gas that flows into the NOx catalyst 3. The NOx concentration in exhaust gas that flows into the NOx catalyst 3 is obtained by the upstream side NOx sensor 11. Alternatively, the NOx concentration in exhaust gas that flows into the NOx catalyst 3 may be estimated based on an operating state of the internal combustion engine 1. The NOx concentration that decreases at the NOx catalyst 3 is obtained by subtracting NOx concentration detected by the downstream side NOx sensor 12 from NOx concentration detected by the upstream side NOx sensor 11. Moreover, in the present embodiment, the downstream side NOx sensor 12 corresponds to the NOx sensor according to the present disclosure.

In addition, in the present embodiment, a failure determination is performed only in a case where lower limit estimated adsorption amount<minimum specific ammonia adsorption amount<maximum specific ammonia adsorption amount<upper limit estimated adsorption amount. In other words, a failure determination is performed only when an actual adsorption amount is estimated to be within an allowable range.

FIG. 14 is a time chart showing transitions of an ammonia adsorption amount of the NOx catalyst 3 and a failure determination permission flag. Among ammonia adsorption amounts, a solid line indicates an estimated adsorption amount, a one-dot chain line indicates a maximum specific ammonia adsorption amount and a minimum specific ammonia adsorption amount, and a two-dot chain line indicates an actual ammonia adsorption amount. In addition, a dashed line indicates an upper limit estimated adsorption amount and a lower limit estimated adsorption amount. The actual ammonia adsorption amount is a value that cannot be determined by the ECU 10. A failure determination permission flag is a flag indicating whether or not a state exists where a failure determination can be performed. A failure determination is permitted when the failure determination permission flag is on and a failure determination is prohibited when the failure determination permission flag is off. Moreover, even if the failure determination permission flag is on, a failure determination may be prohibited because another condition is not satisfied.

When the maximum specific ammonia adsorption amount is larger than the upper limit estimated adsorption amount, the ammonia adsorption amount may possibly be excessively large. Therefore, the downstream side NOx sensor 12 may detect ammonia flowing out from the NOx catalyst 3 and calculate a lower NOx purification rate than reality. In such a case, when a failure determination is performed based on the NOx purification rate, an erroneous determination may occur. In contrast, an erroneous determination can be prevented by prohibiting a failure determination when the maximum specific ammonia adsorption amount is larger than the upper limit estimated adsorption amount.

Furthermore, when the minimum specific ammonia adsorption amount is smaller than the lower limit estimated adsorption amount, the ammonia adsorption amount may possibly be excessively small. Therefore, since there is a possibility that the NOx purification rate may decline, an erroneous determination may occur if a failure determination is to be performed based on the NOx purification rate. In contrast, an erroneous determination can be prevented by prohibiting a failure determination when the minimum specific ammonia adsorption amount is smaller than the lower limit estimated adsorption amount.

FIG. 15 is a flow chart showing a flow of a failure determination of an exhaust gas purification apparatus according to the present embodiment. The present flow chart is repetitively performed every prescribed period of time by the ECU 10. Moreover, steps in which same processes as those in the flow chart described earlier are performed will be denoted by same reference characters and a description thereof will be omitted.

In the flow chart shown in FIG. 15, when a positive determination is made in step S105, the flow proceeds to step S201. Subsequently, in step S201, the failure determination permission flag is turned on. On the other hand, when a negative determination is made in step S104 or when a negative determination is made in step S105, the flow proceeds to step S202. Subsequently, in step S202, the failure determination permission flag is turned off.

As described above, by performing a failure determination only in a case where lower limit estimated adsorption amount<minimum specific ammonia adsorption amount<maximum specific ammonia adsorption amount<upper limit estimated adsorption amount, an erroneous determination can be prevented from being made during the failure determination even if there are errors in the sensors or the like.

However, depending on an operating state of the internal combustion engine 1 or the like, there may be cases where the condition of lower limit estimated adsorption amount<minimum specific ammonia adsorption amount<maximum specific ammonia adsorption amount<upper limit estimated adsorption amount is not satisfied. In addition, there may be cases where the relationship is only infrequently satisfied. In such cases, a frequency of performing a failure determination of the exhaust gas purification apparatus may not reach a required frequency. In consideration thereof, in the present embodiment, a first failure determination (hereinafter, referred to as a first determination) may be performed when lower limit estimated adsorption amount<minimum specific ammonia adsorption amount is satisfied, a second failure determination (hereinafter, referred to as a second determination) may be performed when maximum specific ammonia adsorption amount<upper limit estimated adsorption amount is satisfied, and a failure determination of the exhaust gas purification apparatus may be performed based on results of the first determination and the second determination. In the present embodiment determinations are respectively made in the first determination and the second determination and a final determination is made based on a combination of the respective determination results.

Hereinafter, two examples will be described regarding a case of preventing the exhaust gas purification apparatus from being erroneously determined to have failed even though the exhaust gas purification apparatus has not failed and a case of preventing the exhaust gas purification apparatus from being erroneously determined not to have failed even though the exhaust gas purification apparatus has failed. Moreover, since there is a possibility that hazardous substances in exhaust gas may increase when an erroneous determination that the exhaust gas purification apparatus has not failed is made even though the exhaust gas purification apparatus has failed, preventing this erroneous determination is more important than preventing an erroneous determination that the exhaust gas purification apparatus has failed even though the exhaust gas purification apparatus has not failed.

First, a case of preventing an erroneous determination that the exhaust gas purification apparatus has failed even though the exhaust gas purification apparatus has not failed will be described. FIG. 16 is a time chart showing transitions of an ammonia adsorption amount of the NOx catalyst 3, a first determination permission flag, and a second determination permission flag. The first determination permission flag is turned on when conditions for performing the first determination exist and turned off when conditions for performing the first determination do not exist. In addition, the second determination permission flag is turned on when conditions for performing the second determination exist and turned off when conditions for performing the second determination do not exist. The ammonia adsorption amount shown in FIG. 16 is similar to that in FIG. 14.

Since the first determination is performed when lower limit estimated adsorption amount<minimum specific ammonia adsorption amount is satisfied, the first determination is performed in a state where at least the ammonia adsorption amount of the NOx catalyst 3 is not excessively small. For example, even when the exhaust gas purification apparatus has not failed, the exhaust gas purification apparatus may be erroneously determined to have failed due to a temporary decline in the ammonia adsorption amount (or a decline in the NOx purification rate). According to the first determination, such an erroneous determination can be prevented.

Since the second determination is performed when maximum specific ammonia adsorption amount<upper limit estimated adsorption amount is satisfied, the second determination is performed in a state where at least the ammonia adsorption amount of the NOx catalyst 3 is not excessively large. For example, even when the exhaust gas purification apparatus has not failed, the exhaust gas purification apparatus may be erroneously determined to have failed due to temporary desorption of ammonia. According to the second determination, such an erroneous determination can be prevented.

However, in the first determination, there is a possibility that, even though the exhaust gas purification apparatus has not failed, the exhaust gas purification apparatus may be determined to have failed due to temporary desorption of ammonia. In other words, with the first determination, although a failure determination of the exhaust gas purification apparatus is actually performed in a state where at least the ammonia adsorption amount is not excessively small, the ammonia adsorption amount not being excessively large is not included in the conditions for performing the first determination. Therefore, there may be cases where the first determination is performed in a state where the ammonia adsorption amount is excessively large. Since ammonia may temporarily flow out from the NOx catalyst 3 even though the exhaust gas purification apparatus has not failed, when a determination is made that the exhaust gas purification apparatus has failed based on a detection value of the downstream side NOx sensor 12 at this point, the determination may possibly be an erroneous determination.

In contrast, by performing the second determination in addition to the first determination, accuracy of the failure determination of the exhaust gas purification apparatus can be improved. In other words, in the second determination, since a failure determination of the exhaust gas purification apparatus is actually performed in a state where at least the ammonia adsorption amount is not excessively large, if it is determined that the exhaust gas purification apparatus has not failed in the second determination, the first determination has conceivably been an erroneous determination. Moreover, either the first determination or the second determination may be performed first or the first determination and the second determination may be performed at the same time.

On the other hand, in the second determination, there is a possibility that, even though the exhaust gas purification apparatus has not failed, the exhaust gas purification apparatus is determined to have failed due to an adsorption amount of ammonia being temporarily insufficient. In other words, with the second determination, although a failure determination of the exhaust gas purification apparatus is performed in a state where the ammonia adsorption amount is not excessively large, the ammonia adsorption amount not being excessively small is not included in the conditions for performing the failure determination. Therefore, there may be cases where the second determination is performed in a state where the ammonia adsorption amount is excessively small. Since the ammonia adsorption amount may temporarily decrease and the NOx purification rate may decline even though the exhaust gas purification apparatus has not failed, when a determination is made that the exhaust gas purification apparatus has failed based on a detection value of the downstream side NOx sensor 12 at this point, the determination may possibly be an erroneous determination.

In contrast, by performing the first determination in addition to the second determination, accuracy of the failure determination of the exhaust gas purification apparatus can be improved. In other words, in the first determination, since a failure determination of the exhaust gas purification apparatus is actually performed in a state where at least the ammonia adsorption amount is not excessively small, if it is determined that the exhaust gas purification apparatus has not failed in the first determination, the second determination has conceivably been an erroneous determination.

As described above, the exhaust gas purification apparatus is finally determined not to have failed only when the exhaust gas purification apparatus is determined not to have failed by the first determination or the second determination. When the exhaust gas purification apparatus is determined to have failed by both the first determination and the second determination, since there is a possibility of an erroneous determination, a determination is made after waiting for the condition of lower limit estimated adsorption amount<minimum specific ammonia adsorption amount<maximum specific ammonia adsorption amount<upper limit estimated adsorption amount to be satisfied.

FIG. 17 is a diagram showing a combination of determination results of the first determination and the second determination. When the first determination or the second determination is performed in a first time determination and the exhaust gas purification apparatus is determined not to have failed, the result is conclusively determined. In other words, the exhaust gas purification apparatus is conclusively determined not to have failed.

When the first determination is performed in the first time determination and a determination of a failure is made, since it is possible that the exhaust gas purification apparatus has failed but it is also possible that an erroneous determination has been made, a second time determination is performed. When the second determination is performed in the second time determination and a determination of no failure is made, the exhaust gas purification apparatus is conclusively determined not to have failed. In other words, when a determination of no failure is made in the second determination that is performed in a state where the ammonia adsorption amount is not excessively large, the first determination has conceivably been performed in a state where the ammonia adsorption amount is temporarily excessively large. Therefore, when a determination of no failure is made in the second determination, the exhaust gas purification apparatus is conclusively determined not to have failed.

On the other hand, when the first determination is performed in the first time determination and a determination of a failure is made and the second determination is performed in the second time determination and a determination of a failure is made, there is a possibility that erroneous determinations have been respectively made in the first determination and the second determination. Therefore, a determination is performed after waiting for a state to arrive where the first determination and the second determination can be performed at the same time. In this case, a state where the first determination and the second determination can be performed at the same time can be created by performing control for adjusting the ammonia adsorption amount.

In addition, when the second determination is performed in the first time determination and a determination of a failure is made, since it is possible that the exhaust gas purification apparatus has failed but it is also possible that an erroneous determination has been made, a second time determination is performed. When the first determination is performed in the second time determination and a determination of no failure is made, the exhaust gas purification apparatus is conclusively determined not to have failed. In other words, when a determination of no failure is made in the first determination that is performed in a state where the ammonia adsorption amount is not excessively small, the second determination has conceivably been performed in a state where the ammonia adsorption amount is temporarily excessively small. Therefore, when a determination of no failure is made in the first determination, the exhaust gas purification apparatus is conclusively determined not to have failed.

On the other hand, when the second determination is performed in the first time determination and a determination of a failure is made and the first determination is performed in the second time determination and a determination of a failure is made, there is a possibility that erroneous determinations have been respectively made in the first determination and the second determination. Therefore, a determination is performed after waiting for a state to arrive where the first determination and the second determination can be performed at the same time. In this case, a state where the first determination and the second determination can be performed at the same time can be created by performing control for adjusting the ammonia adsorption amount.

As described above, the exhaust gas purification apparatus can be prevented from being erroneously determined to have failed when the ammonia adsorption amount temporarily declines even when the NOx catalyst 3 has not failed and when ammonia flows out from the NOx catalyst 3 when the NOx catalyst 3 has not failed.

Next, a case of preventing an erroneous determination that the exhaust gas purification apparatus has not failed even though the exhaust gas purification apparatus has failed will be described. FIG. 18 is another diagram showing a combination of determination results of the first determination and the second determination. By performing a failure determination according to the relationship shown in FIG. 18, for example, even when the exhaust gas purification apparatus has failed, the erroneous determination can be prevented from being erroneously determined not to have failed due to a temporary increase in the ammonia adsorption amount (or a temporary increase of the NOx purification rate).

In the relationship shown in FIG. 18, when the first determination is performed in the first time determination and a determination of a failure is made, the exhaust gas purification apparatus is conclusively determined to have failed. Since a determination of a failure is made in the first determination that is performed in a state where the ammonia adsorption amount is not excessively small, the exhaust gas purification apparatus can be prevented from being determined to have failed due to a temporary decline in the ammonia adsorption amount even though the ammonia adsorption amount has not failed.

On the other hand, when the first determination is performed in the first time determination and a determination of no failure is made, it is possible that the exhaust gas purification apparatus has not failed but it is also possible that an erroneous determination has been made. In other words, even when the exhaust gas purification apparatus has failed, there is a possibility that the exhaust gas purification apparatus has been erroneously determined not to have failed due to a temporary increase in the ammonia adsorption amount (in other words, a temporary increase in the NOx purification rate). Therefore, a second time determination is performed. When the second determination is performed in the second time determination and a determination of no failure is made, the exhaust gas purification apparatus is conclusively determined not to have failed. In other words, when a determination of no failure is made in the second determination that is performed in a state where the ammonia adsorption amount is not excessively large, a result of the first determination is conceivably correct. Therefore, when a determination of no failure is made in the second determination, the exhaust gas purification apparatus is conclusively determined not to have failed.

When the first determination is performed in the first time determination and a determination of no failure is made and the second determination is performed in the second time determination and a determination of a failure is made, there is a possibility that erroneous determinations have been respectively made in the first determination and the second determination. Therefore, a determination is performed after waiting for a state to arrive where the first determination and the second determination can be performed at the same time. In this case, a state where the first determination and the second determination can be performed at the same time can be created by performing control for adjusting the ammonia adsorption amount.

On the other hand, when the second determination is performed in the first time determination and a determination of no failure is made, the exhaust gas purification apparatus is conclusively determined not to have failed. Since a determination of no failure is made in the second determination that is performed in a state where the ammonia adsorption amount is not excessively large, the exhaust gas purification apparatus can be prevented from being determined not to have failed due to a temporary increase in the ammonia adsorption amount even though the ammonia adsorption amount has failed.

In addition, when the second determination is performed in the first time determination and a determination of a failure is made, since it is possible that the exhaust gas purification apparatus has failed but it is also possible that an erroneous determination has been made, a second time determination is performed. When the first determination is performed in the second time determination and a determination of a failure is made, the exhaust gas purification apparatus is conclusively determined to have failed. In other words, when a determination of a failure is made in the first determination that is performed in a state where the ammonia adsorption amount is not excessively small, the second determination has conceivably been performed in a state where the ammonia adsorption amount is temporarily excessively small. Therefore, when a determination of a failure is made in the first determination, the exhaust gas purification apparatus is conclusively determined to have failed.

On the other hand, when the second determination is performed in the first time determination and a determination of a failure is made and the first determination is performed in the second time determination and a determination of no failure is made, there is a possibility that erroneous determinations have been respectively made in the first determination and the second determination. Therefore, a determination is performed after waiting for a state to arrive where the first determination and the second determination can be performed at the same time. In this case, a state where the first determination and the second determination can be performed at the same time can be created by performing control for adjusting the ammonia adsorption amount.

As described above, the exhaust gas purification apparatus can be prevented from being erroneously determined to have failed due to a temporary decline in the ammonia adsorption amount even though the NOx catalyst 3 has not failed and the exhaust gas purification apparatus can be prevented from being erroneously determined not to have failed due to an increase in a NOx purification rate caused by a temporary increase in the ammonia adsorption amount of the NOx catalyst 3 even though the NOx catalyst 3 has failed.

As described above, according to the present embodiment, accuracy of failure determination of the exhaust gas purification apparatus can be further improved.

The invention claimed is:

1. An exhaust gas purification apparatus of an internal combustion engine comprising:
    an adding valve which is provided in an exhaust passage of the internal combustion engine and configured to add an ammonia precursor or ammonia into the exhaust passage; and
    a selective reduction-type NOx catalyst which is provided in the exhaust passage on a downstream side of the adding valve and configured to reduce NOx using ammonia adsorbed inside the catalyst,
    the exhaust gas purification apparatus of an internal combustion engine configured to control an ammonia adsorption amount of the selective reduction-type NOx catalyst by adding the ammonia precursor or ammonia using the adding valve,
    the exhaust gas purification apparatus of an internal combustion engine further comprising:
    a controller programmed to:
    estimate the ammonia adsorption amount based on at least one prescribed parameter related to the ammonia adsorption amount and estimate a specific ammonia adsorption amount that is an estimated value of the ammonia adsorption amount specified by at least one of a maximum value and a minimum value of an estimated value of the ammonia adsorption amount based on an error in the at least one prescribed parameter; and
    when the specific ammonia adsorption amount is outside a target range of the ammonia adsorption amount, control addition of the ammonia precursor or ammonia using the adding valve such that the specific ammonia adsorption amount returns to the target range, wherein
    the controller is further programmed to:
    estimate an ammonia adsorption amount of the selective reduction-type NOx catalyst based on the at least one prescribed parameter that does not take the error in the at least one prescribed parameter into consideration, and
    set a range of the ammonia adsorption amount including a prescribed allowable error as the target range with respect to an ammonia adsorption amount of the selective reduction-type NOx catalyst which is estimated based on the at least one prescribed parameter that does not take the error in the at least one prescribed parameter into consideration.

2. The exhaust gas purification apparatus of an internal combustion engine according to claim 1, wherein
    the controller is programmed to reduce the amount of the ammonia precursor or ammonia added from the adding valve when a maximum value of the specific ammonia adsorption amount is larger than an upper limit value of the target range, and the controller is programmed to increase the amount of the ammonia precursor or ammonia added from the adding valve when a minimum value of the specific ammonia adsorption amount is smaller than a lower limit value of the target range.

3. The exhaust gas purification apparatus of an internal combustion engine according to claim 1, wherein
    the controller is programmed to change the prescribed allowable error in accordance with a temperature of the selective reduction-type NOx catalyst.

4. The exhaust gas purification apparatus of an internal combustion engine according to claim 1, further comprising a NOx sensor configured to detect a NOx concentration in exhaust gas that flows out from the selective reduction-type NOx catalyst, wherein
    the controller is programmed to calculate a NOx purification rate of the selective reduction-type NOx catalyst based on a detection value of the NOx sensor and, when both a maximum value and a minimum value of the specific ammonia adsorption amount are within the target range, the controller is programmed to perform a failure determination of the exhaust gas purification apparatus based on the NOx purification rate of the selective reduction-type NOx catalyst that is calculated based on the detection value of the NOx sensor.

5. The exhaust gas purification apparatus of an internal combustion engine according to claim 1, further comprising a NOx sensor configured to detect a NOx concentration in exhaust gas that flows out from the selective reduction-type NOx catalyst, wherein
    the controller is programmed to calculate a NOx purification rate of the selective reduction-type NOx catalyst based on a detection value of the NOx sensor and, when at least one of a maximum value and a minimum value of the specific ammonia adsorption amount is within the target range, the controller is programmed to perform a failure determination of the exhaust gas purification apparatus based on the NOx purification rate of the selective reduction-type NOx catalyst that is calculated based on the detection value of the NOx sensor.

6. The exhaust gas purification apparatus of an internal combustion engine according to claim 5, wherein the controller is programmed to perform a first determination in which the failure determination is performed when a minimum value of the specific ammonia adsorption amount is larger than a lower limit value of the target range and a second determination in which the failure determination is performed when a maximum value of the specific ammonia adsorption amount is smaller than an upper limit value of the target range, and make a final determination based on a determination result of the first determination and a determination result of the second determination.

* * * * *